US012589622B2

(12) United States Patent
Gentner

(10) Patent No.: US 12,589,622 B2
(45) Date of Patent: Mar. 31, 2026

(54) TRAILER COUPLING WITH REST POSITION LOCKING DEVICE AND DETECTOR UNIT

(71) Applicant: ACPS Automotive GmbH, Ingersheim (DE)

(72) Inventor: Wolfgang Gentner, Steinheim (DE)

(73) Assignee: ACPS Automotive GmbH (DE)

( * ) Notice: Subject to any disclaimer, the term of this patent is extended or adjusted under 35 U.S.C. 154(b) by 411 days.

(21) Appl. No.: 18/332,332

(22) Filed: Jun. 9, 2023

(65) Prior Publication Data

US 2023/0398823 A1     Dec. 14, 2023

(30) Foreign Application Priority Data

Jun. 14, 2022    (DE) ..................... 10 2022 114 954.4

(51) Int. Cl.
B60D 1/54          (2006.01)
B60D 1/24          (2006.01)
B60D 1/06            (2006.01)

(52) U.S. Cl.
CPC .............. B60D 1/54 (2013.01); B60D 1/246 (2013.01); *B60D 1/06* (2013.01); *B60D 2001/544* (2013.01)

(58) Field of Classification Search
CPC ............. B60D 1/54; B60D 1/246; B60D 1/06
See application file for complete search history.

(56) References Cited

U.S. PATENT DOCUMENTS

| 10,189,323 | B2 * | 1/2019 | Kadnikov | ............... B60D 1/54 |
| 2002/0020988 | A1 | 2/2002 | Kleb et al. | |
| 2017/0072753 | A1 | 3/2017 | Kadnikov et al. | |
| 2021/0129609 | A1 | 5/2021 | Gentner et al. | |
| 2021/0370729 | A1 | 12/2021 | Rimmelspacher et al. | |
| 2023/0047694 | A1 * | 2/2023 | Gentner | ................... B60D 1/64 |
| 2023/0398823 | A1 * | 12/2023 | Gentner | ................... B60D 1/54 |

FOREIGN PATENT DOCUMENTS

| DE | 102014008077 A1 | 12/2015 | |
| DE | 102014111426 A1 | 2/2016 | |
| DE | 102020114230 A1 | 12/2021 | |
| DE | 102021121092 A1 | 2/2023 | |
| EP | 0832000 A1 | 4/1998 | |
| EP | 1142732 A2 | 10/2001 | |
| EP | 2316669 A1 * | 5/2011 | ............... B60D 1/62 |
| EP | 3141405 A1 | 3/2017 | |
| EP | 3815936 A1 | 5/2021 | |

* cited by examiner

*Primary Examiner* — Kevin Hurley
(74) *Attorney, Agent, or Firm* — Reinhart Boerner Van Deuren P.C.

(57)          ABSTRACT

In a trailer coupling, in order to detect the rest position and/or the operating position by means of an unambiguous signal, it is proposed that a detector unit is associated with the rest position locking device, said detector unit detecting at least one active position of the rest position locking device.

37 Claims, 25 Drawing Sheets

1

TRAILER COUPLING WITH REST POSITION LOCKING DEVICE AND DETECTOR UNIT

CROSS-REFERENCE TO RELATED PATENT APPLICATION

The present disclosure relates to the subject matter disclosed in German application number 10 2022 114 954.4 of Jun. 14, 2022, which is incorporated herein by reference in its entirety and for all purposes.

BACKGROUND OF THE INVENTION

The invention relates to a trailer coupling comprising a ball neck which is movable between an operating position and a rest position with a pivot bearing body arranged on a first end and a coupling ball arranged on a second end, a pivot bearing unit fixedly arranged on a vehicle, by which pivot bearing unit the pivot bearing body is accommodated to be pivotable about a pivot axis between the operating position and the rest position, a rotation blocking device which, in the operating position, in a rotation blocking position, blocks a pivot movement of the pivot bearing body about the pivot axis and, in a releasing position, frees the pivot movement of the pivot bearing body, and a rest position locking device which, in an inactive position, permits a movement of the pivot bearing body relative to the pivot bearing unit and, in a locking position, non-rotatably fixes the pivot bearing body relative to the pivot bearing unit.

Trailer couplings of this type are known from EP 3 815 936 A1.

The problem exists, however, in trailer couplings of this type, of detecting the rest position and/or the operating position with an unambiguous signal.

SUMMARY OF THE INVENTION

In accordance with an embodiment of the invention, a trailer coupling of the aforementioned type is provided in which associated with the rest position locking device is a detector unit which detects at least one active position of the rest position locking device.

With a detector unit of this type, the possibility therefore exists of generating a signal by detecting the at least one active position of the rest position locking device, said signal clearly indicating that the pivot bearing body is reliably locked in the rest position by means of the rest position locking device and is therefore secured.

It is further advantageous if the detector unit also detects an inactive position of the rest position locking device.

Since the rest position locking device is to have only two positions, specifically one active and one inactive position, the detection of the active and the inactive position creates the possibility of establishing whether there is a defect in the rest position locking device and/or whether the detector unit always reliably detects the positions of the rest position locking device.

It is, in principle, conceivable to detect the at least one position of the rest position locking device, for example, by means of a touch contact switch.

Such a touch contact switch has the problem, however, that it must be integrated into the structure of the rest position locking device.

2

For this reason, a further advantageous solution provides that the detector unit detects the at least one position of the rest position locking device contactlessly.

Such a contactless detection of the at least one position of the rest position locking device could take place, for example, by capacitive means or also by optical means.

A robustly operating and fault-free detection is, however, provided if the detector unit detects the at least one position of the rest position locking device by means of a magnetic field influenced by the at least one position of the rest position locking device.

This can be achieved, in particular, if the detector unit has a magnetic field sensor.

A magnetic field sensor of this type is, for example, a Hall sensor.

It is also conceivable, however, to provide magnetically actuatable contacts such as, for example, reed contacts or other magnetically-based sensors.

For the influencing of the magnetic field by the rest position locking device, a wide variety of possible solutions is conceivable.

One possibility provides that the magnetic field sensor detects a magnetic field of a magnet movable by the movement of the rest position locking device.

In this case, the magnet is moved by a component of the rest position locking device relative to the magnetic field sensor, so that the magnetic field sensor can thus detect the magnetic field varying due to the movement.

Another advantageous solution provides, however, that the magnetic field sensor detects a magnetic field of a stationary magnet associated with it and influenced by the positions of the rest position locking device.

This means that the magnet itself is not moved, rather its magnetic field is changed by the components of the rest position locking device, in particular magnetizable components of the rest position locking device.

In order that the detector unit can be easily mounted and operated in a protected manner, it is particularly advantageous if the detector unit detects at least the active position of the rest position locking device through a covering of the pivot bearing unit overlapping the rest position locking device so that thereby, with the covering of the pivot bearing unit a protection, firstly, of the rest position locking device and, secondly, of the detector unit, against external influences can easily be realized.

In the simplest case, the covering is therein arranged on the pivot bearing body and is pivotable with the pivot bearing body so that the detector unit is movable together with the pivot bearing body.

It is particularly advantageous if the rest position locking device is independent of the rotation blocking device and therefore functions autonomously.

Furthermore, it is preferably provided that, on reaching the pivot position of the pivot bearing body corresponding to the rest position, due to a spring element provided in the rest position locking device, the rest position locking device transitions independently into the active position, that is the locking position.

Furthermore, it is preferably provided that the rest position locking device, when it is not in the active position, is always in a locking readiness position, that is a position in which it has the possibility to transition into the active position or locking position at any time.

With regard to the transition of the rest position locking device from the active position into the inactive position and the triggering of this transition, so far no further details have been given.

It is conceivable, for example, to trigger the transition of the rest position locking device from the active position into the inactive position by means of a rotary movement of the pivot bearing body.

It is particularly advantageous, however, if a deactivating unit is provided with which the rest position locking device is transitionable from the active position into the inactive position, independently of the pivot movement of the pivot bearing body.

In order to coordinate the transition of the rest position locking device from the active position into the inactive position with the function of the trailer coupling, it is preferably provided that the rest position locking device is transitionable by means of the deactivating unit, dependent upon a particular functional state of the trailer coupling, from the active position into the inactive position.

This can advantageously be coordinated with the function of the trailer coupling if the rest position locking device is transitionable by means of the deactivating unit, before a pivoting of the pivot bearing body from the rest position into the operating position, from the active position into the inactive position.

For this purpose, it is provided, in particular, that the rest position locking device is transitionable by means of the deactivating unit, by a drive unit cooperating with the deactivating unit, from the active position into the inactive position.

With regard to the construction of the rest position locking device itself, so far no further details have been given.

It is therefore provided, for example, that the rest position locking device comprises a locking body that is movable from an active position into an inactive position, wherein in the active position, the locking body causes the locking in the rest position and, in the inactive position causes no locking.

It is particularly favorable if the locking body arranged on the pivot bearing body or the pivot bearing unit is movable in a locking direction and is bringable, in the active position, into engagement with a locking receptacle arranged in the pivot bearing unit or the pivot bearing body.

It is therein particularly favorable if the locking body movable in the locking direction is arranged in the pivot bearing body and thus is movable together with the pivot bearing body and if the locking receptacle is arranged on the pivot bearing unit.

With regard to the course of the locking direction, a wide variety of possibilities are conceivable.

An advantageous solution thus provides that the locking direction extends parallel to the pivot axis.

In the case of a locking body and a locking receptacle cooperating therewith, it is preferably provided that an actuating body of the deactivating unit is associated with the locking receptacle, which actuating body, with the deactivating unit operative, displaces the locking body out of the locking receptacle and thus transitions the locking body from the active position into the inactive position in a simple manner.

Concerning the detection of the active and inactive position of the rest position locking device by the detector unit, it has so far not been explained in detail what signals are generated in this regard.

Thus, an advantageous solution provides that the trailer coupling has a state evaluating unit which evaluates at least one signal of the detector unit and generates a signal indicating a secured rest position.

Since it is important in the trailer coupling according to the invention to maintain the operating position reliably, it is preferably provided that the trailer coupling has a securing device which secures the rotation blocking device in the rotation blocking position against a transition into the releasing position.

In this case, it is also provided that associated with the securing device is a detector which detects a securing or unsecuring position of a securing pin securing the rotation blocking position and thus creates the possibility of recognizing whether a securing of the rotation blocking position exists or not.

It is provided, in particular, that the securing pin is urged by a spring element in the direction of its position securing the rotation blocking position.

It is further suitably provided in this case that the detector of the securing device cooperates with the state evaluating unit and that the state evaluating unit generates a signal indicating a secured rotation blocking position of the rotation blocking device.

It is particularly advantageous if the state evaluating unit only generates a signal indicating a secured rest position when the detector unit signals the active position of the rest position locking device and also the detector signals the unsecuring position of the securing device.

It is also preferably provided that the state evaluating unit only generates the signal indicating a secured operating position when the detector signals the securing position of the securing device and the detector unit signals the inactive position of the rest position locking device.

With that the possibility exists of unambiguously recognizing the secured rest position or the secured operating position and simultaneously of ensuring that no error function of the detector unit or the detector is present.

With regard to the construction of the rotation blocking device, no further details have so far been given in the context of the description above of the solution according to the invention.

Thus, an advantageous solution provides that the rotation blocking device has at least two rotation blocking bodies which are movably guided by means of a guide body in a guiding direction, wherein in the operating position, the rotation blocking bodies are bringable into a rotation blocking position by way of a movement in the guiding direction and therein are each in engagement with a receptacle in the pivot bearing body in order to block a pivot movement of the pivot bearing body about the pivot axis relative to the guide body and are bringable into a releasing position and therein are out of engagement with the respective receptacle, and in that the rotation blocking device comprises an actuating body having a pressure surface extending transversely to the guiding direction for each of the rotation blocking bodies, by means of the movement of which actuating body in an actuating direction, the at least two rotation blocking bodies are movable in the guiding direction and are able to be acted upon.

In particular, with the rest position locking device according to the invention with a deactivating unit as described above, the possibility exists that a distribution transmission is provided which is drivable by means of a drive element and which has a first output element by means of which a driving of the pivot movement of the pivot bearing body with the ball neck takes place, and has a second output element which cooperates with the deactivating unit for deactivating the rest position locking device.

This means that the drive for the deactivating unit can be derived from a distribution transmission which, firstly, brings about a driving of the pivot movement of the pivot bearing body and, secondly, serves to drive the deactivating unit.

The distribution transmission can therein be configured in widely varying ways.

Thus, an advantageous solution provides that the distribution transmission automatically couples the drive element to the first output element or the second output element.

Further, the distribution transmission can be configured in widely varying ways.

A simple and advantageous solution provides that the distribution transmission is an epicyclic gear train, in particular a planetary gearset.

In addition, it is suitably provided that the drive element of the distribution transmission is driven by means of the, in particular electrically powered, drive unit.

With regard to the construction of the rotation blocking device, no further details have so far been given in the context of the description above of the solution according to the invention.

An advantageous solution thus provides that the rotation blocking bodies are arranged about the actuating body.

Preferably therein, for example, not just two, but three rotation blocking bodies are provided.

In principle, the rotation blocking bodies can be arranged in any desired manner relative to the actuating body.

An exemplary embodiment therein provides that the rotation blocking bodies are arranged about the actuating body. With a solution of this type, firstly, a space-saving arrangement of the rotation blocking bodies and, secondly, an at least partial compensation for the reaction forces acting on the actuating body, is possible.

Such an arrangement is particularly favorable if the rotation blocking bodies are arranged substantially symmetrically relative to a plane extending perpendicularly to the pivot axis.

It is particularly favorable for an action upon the rotation blocking bodies if the actuating body has wedge surfaces extending transversely to the guiding direction.

It is preferably provided that the actuating body is arranged to be rotatable about the pivot axis and has wedge surfaces, in particular extending over an angular range about the pivot axis and varying parallel to the guiding direction.

Thereby, the rotation blocking bodies can be moved easily into the rotation blocking position.

In particular, the functionality of the rotation blocking bodies is optimal if the guiding direction extends with at least one component in a direction radial to the pivot axis.

It is particularly favorable if the guiding direction extends approximately in a direction radial to the pivot axis.

Therein, an approximate course in a direction radial to the pivot axis can deviate from the radial direction by up to 30°.

Furthermore, in the context of the description so far of the solution according to the invention, no details have been given regarding how the rotation blocking bodies are themselves to be guided in the guiding direction.

For example, it is conceivable to guide the rotation blocking body by means of a guiding receptacle in the pivot bearing body and to provide stationary receptacles with which the at least one rotation blocking body is bringable into or out of engagement.

Further, it is preferably provided that the rotation blocking body is guided by way of guide bodies adjoining the pivot bearing body in a radial direction, so that thereby also, a compact construction of the rotation blocking device is possible.

In particular, the guide body is therein constructed so that it has a guide sleeve with the guiding receptacle for the respective rotation blocking body.

With regard also to the guiding of the actuating body in the pivot bearing unit, no further details have so far been given.

Thus, a particularly favorable solution provides that the guide body guides the actuating body movably, in particular rotatably.

In addition, for a compact and mechanically simple construction of the pivot bearing unit, it is favorable if the guide body carries a pivot bearing for the pivot bearing body or itself forms a pivot bearing.

In addition, it is suitably provided that the guide body is part of the pivot bearing unit fixedly arranged on a vehicle.

In the context of the solution according to the invention, different possibilities of the relative arrangement of the guide body, the pivot bearing body and the actuating body are conceivable.

Thus, a solution is conceivable wherein the actuating body surrounds the guide body and the pivot bearing body is surrounded by the guide body, that is, engages into the guide body.

A particularly compact solution provides that the actuating body is surrounded by the guide body and that in particular the pivot bearing body embraces the guide body, so that thereby a compact unit is formed which can be constructed, in particular, to be space-saving.

It is suitably provided that the pivot bearing body forms an outer body externally surrounding the pivot bearing unit, said outer body being arranged non-displaceably relative to the pivot bearing unit in the direction of the pivot axis and that, in particular, the first end of the ball neck is fixed to the outer body.

Such an arrangement of the pivot bearing body has, firstly, the advantage of a favorable spatial construction of the pivot bearing unit itself and the advantage of a relatively simple sealing of the pivot bearing unit, since the pivot bearing body carries out no movements in the axial direction of the pivot axis.

Preferably, provided between a housing of the pivot bearing unit and an end side of the outer body is a seal surrounding the pivot axis, with which sealing against penetrating dirt and moisture takes place.

With a solution of this type, the pivot bearing body simultaneously represents the outer body protecting and enclosing the pivot bearing unit and, in that the outer body is arranged non-displaceably relative to the pivot bearing unit in the direction of the pivot axis, it is achieved in particular that a simple sealing between the outer body and the pivot bearing unit can be realized.

Particularly favorable constructionally is a solution in which the pivot bearing body forms an outer body externally surrounding a partial region of the rotation blocking device, said outer body being arranged non-displaceably relative to the guide body in the direction of the pivot axis.

In particular, it is provided that the rotation blocking bodies are movable by way of the actuating body from a releasing position into a rotation blocking position.

Preferably, therein, the actuating body is constructed so that in the releasing position, it permits the releasing of the rotation blocking body.

In particular, a further embodiment of the actuating body provides that, in the rotation blocking position, it holds the rotation blocking body in its rotation blocking position.

In order to ensure that the rotation blocking bodies always transition into their rotation blocking position, in particular, if no active actuation of the actuating body takes place, it is preferably provided that the actuating body is urged by an elastic energy store in the direction of its rotation blocking position.

In order now to be able to move the actuating body from the rotation blocking position into the releasing position, it is preferably provided that the actuating body is movable by means of an actuating device from the rotation blocking position into the releasing position.

In particular, such a movement of the actuating body takes place by way of the actuating device, contrary to the urging by the energy store, that is, that the actuating device counteracts the urging by the energy store and therefore must overcome the forces applied by the energy store.

In particular, in a rotatable actuating body, it is preferably provided that with the actuating device, the actuating body is rotated contrary to the rotation direction caused by the energy store.

Such an elastic energy store can be arranged, in principle, at several of sites.

It is particularly favorable constructionally if the elastic energy store is arranged within the pivot bearing unit.

A further solution favorable constructionally provides that the elastic energy store is arranged on one side of the actuating body.

In this case, the elastic energy store can advantageously be coupled to the actuating element.

With regard to the influence upon the actuating body, widely varying solutions are conceivable.

An advantageous solution thus provides that the actuating device has an output element which is coupled to the actuating body.

It is possible, in principle, to couple the output element and the actuating body to one another rigidly.

It is, however, particularly favorable if the output element and the actuating body are coupled to one another by way of a driving coupling device which, dependent upon the position of the output element and the position of the actuating body, in particular the rotary position thereof, permits a relative movement about a limited rotary angle.

Therein, the driving coupling device could be an elastic connecting element.

However, it is particularly simple if the driving coupling device has a driving-free floating state and a driving state, that is, that either the floating state or the driving state exists.

With regard to the previous solutions, the driving of the rotation blocking device has been described only in general, which permits a transition of the rotation blocking device from at least one rotation blocking position into a releasing position and vice versa to be realized.

In addition, it is preferably provided that the actuating device for the rotation blocking device comprises a motor drive unit.

Therein, a motor drive unit exclusively associated with the actuating device for the rotation blocking device could be provided.

However, it is particularly favorable if a motor drive unit is provided as a pivot drive for the execution of the pivot movement of the pivot bearing body.

For example, it is conceivable to provide two motor drives, wherein one motor drive is provided for actuating the rotation blocking device and one motor drive is provided for carrying out the pivot movement of the pivot bearing body.

In particular, since a driving of the rotation blocking device always occurs at times when no pivot movement of the pivot bearing body is to occur and additionally a pivot movement of the pivot bearing body always occurs when no driving of the rotation blocking device is required, it is conceivable to provide a switch-over device which switches a fed-in drive energy, for example from a power source, alternatingly from one drive to the other drive, so that the drive power made available from a separate, for example, vehicle-side supply device can be used either for the actuation of the rotation blocking device or for the pivoting of the pivot bearing body.

In this case, however, it is to be detected by way of a corresponding sensor system when the rotation blocking device is in the rotation blocking position or the free-running position and when the pivot bearing body is in the position corresponding to the operating position or the position corresponding to the rest position and according to the positions detected by the sensor system, to switch over the drive power from one drive to the other.

In the case of a drive of the rotation blocking device independently from the drive for the pivot movement of the pivot bearing body, the problem exists that, in the case of a fault, the difficulty arises of finding unambiguous starting positions both for the pivot movement of the pivot bearing body and also for the rotation blocking device.

It is particularly suitable if an output element for driving the rotation blocking device and an output element for driving the pivot movement of the pivot bearing body are coupled by way of an epicyclic gear train driven by means of a drive element.

In this case, the possibility exists of driving the epicyclic gear train by way of a single motor drive unit, in particular a single electric drive unit.

It is particularly favorable if the first output element of the epicyclic gear train acts as a pivot drive on the pivot bearing body for pivoting the ball neck between the operating position and the rest position and the second drive element of the epicyclic gear train acts as an actuating drive on the actuating body, in order to move it from the rotation blocking position into the releasing position.

Therein, the epicyclic gear train is suitably constructed such that it permits a change between the output element for the actuation of the rotation blocking device and the output element for the execution of the pivot movement of the pivot bearing body.

In particular, the epicyclic gear train can be brought in to action in such a way that depending upon the restraint of the output element for the rotation blocking device or the pivot movement of the pivot bearing body, a driving of the pivot movement or the rotation blocking device takes place.

The advantage of using an epicyclic gear train is to be seen in that such a planetary gearset permits a change from one output to the other output by simple means and therefore one drive unit comprising, for example, one electric drive motor and possibly one transmission suffices for driving alternatingly by way of the one output, the movements of the actuating body and by way of the other output, the pivot movement of the ball neck between the operating position and the rest position.

For example, it is provided that a sun gear of the epicyclic gear train is drivable by means of the motor drive.

It is further suitably provided that a ring gear of the epicyclic gear train is coupled to the output for the rotation blocking device.

It is further suitably provided that a planet gear carrier of the epicyclic gear train is coupled to the output for the pivot movement.

In the case of an epicyclic gear train which is powered by a single motor drive, in order to drive either the rotation blocking device or the pivot movement, it is advantageously provided that, depending upon the blocking of the drive of the rotation blocking device or the pivot movement, a driving of the pivot movement or the rotation blocking device takes place.

Such a blocking of the pivot movement or the rotation blocking device is realizable in a variety of ways.

The blocking of the pivot movement is realizable in a simple manner in that the pivot bearing part is lockable relative to the pivot bearing unit, so that on locking of the pivot bearing part, a blocking of the pivot movement necessarily takes place.

A blocking of the drive of the rotation blocking device can take place in a wide variety of ways.

A particularly favorable solution provides that the releasing position locking device is provided for blocking the drive of the rotation blocking device.

With regard to the arrangement of the epicyclic gear train, the most varied of solutions are conceivable.

A particularly compact solution provides that the epicyclic gear train is arranged coaxially with the pivot axis in the pivot bearing unit.

Further, it is preferably provided that the epicyclic gear train is arranged on a side of the actuating element facing toward the motor drive of the rotation blocking device.

For the compact structure, it is particularly advantageous if, viewed in the direction of the pivot axis, the epicyclic gear train is driven on one side by the motor drive unit and, on the opposite side, has a drive for the actuating element.

Therefore, the epicyclic gear train is preferably arranged, viewed in the direction of the pivot axis, between the motor drive unit and the actuating element.

In addition, the epicyclic gear train, the elastic energy store and the actuating element are preferably arranged in the direction of the pivot axis following one another, in particular, within the pivot bearing unit.

In order to ensure, in particular, that even if an urging by the elastic energy store takes place, the actuating body does not leave its rotation blocking position, it is preferably provided that the actuating body is blockable by means of the securing device in its rotation position.

It is provided, in particular, that the actuating body is blockable by the securing device against reaching its releasing position, in order to ensure that the actuating body never automatically permits the releasing position of the rotation blocking body, for example, on a breakage of the elastic energy store which urges it in the direction of its active position.

Such a securing device is constructed such that it requires an operation to override the blocking of the actuating body.

For this reason, it is suitably provided that the actuating apparatus for the rotation blocking device is coupled to the securing device, so that by way of the actuating apparatus, a releasing of the blocking of the actuating body can be overridden by the securing device.

Preferably, therein, the securing device is coupled to the actuating apparatus such that the securing device blocks a movement of the actuating body not triggered by an actuation.

In particular, the securing device is constructed such that, with a non-actuated actuating apparatus, it blocks a movement of the actuating body into its releasing position.

A suitable solution provides that the drive element of the actuating apparatus, for example, the output element of the planetary gearset, is coupled to the securing device.

Suitably, the output element, for example the output element of the epicyclic gear train can be constructed such that by way of the output element, the influence on the actuating body and the influence on the securing device are matched to one another so that an actuation of the actuating apparatus leads, firstly, to the blocking of the actuating body being cancelled and, secondly, to the actuating body being moved from the active position into the inactive position.

For example, for this purpose, it is provided that, during its movement from the starting position into an intermediate position, the output element transitions the securing device from the securing position into the unsecuring position.

With regard to the coupling between the output element and the securing device, a wide variety of possibilities are conceivable.

For example, any type of coupling, for example, even by way of an electrical control system, is conceivable.

A solution that is particularly suitable due to its simplicity provides that the output element and the securing device are coupled together by way of a mechanical coupling device.

The mechanical coupling device is favorably constructed such that it controls the influence on the securing device by means of a guide track.

With regard to the construction of the securing device, a wide variety of different solutions are conceivable.

The securing device operates particularly reliably if it has an elastic energy store which continuously urges the securing device in the direction of its position securing or blocking the actuating body in the rotation blocking position.

Additionally, it is preferably provided that the securing device is movable, starting from its securing position, into an unsecured position.

Preferably, therein, a movement of the securing device into the unsecured position also takes place by means of the output unit for the actuating unit, in particular also by means of the second output element of the distribution transmission.

In the solution according to the invention, the rotation blocking device is to be inoperative up to and on reaching the rest position, so that the necessity exists to hold the rotation blocking device in the releasing position, in particular with the actuating body, during these pivot movements.

It is herein conceivable, in principle, to provide a separate drive which moves the actuating body from the rotation blocking position into the releasing position and holds it there until the rotation blocking position is again to be assumed.

During pivoting of the pivot bearing body into the rest position, in order to be able to maintain the releasing position of the rotation blocking device with simple means, a releasing position locking device is provided which is movable, in a releasing position of the actuating body, between a locking releasing position freeing a movement of the actuating body relative to the guide body and a locking position fixing the actuating body relative to the guide body, and at least in the releasing position of the actuating body, is urged by a spring element in the direction of the locking position.

With a releasing position locking device of this type, the possibility exists of holding the actuating body in the releasing position by simple means during the movement of the ball neck and thus during the rotation movement of the pivot bearing body from the operating position into the rest position.

With the solution according to the invention, the possibility exists, in particular, of rotating the pivot bearing body without it being acted upon in any way by the rotation blocking bodies and additionally the possibility exists of utilizing the rotation blocking device, for example, merely for fixing the pivot bearing body in the rotation position corresponding to the operating position of the ball neck.

It is preferably provided to apply a force, for example the force of a spring, continuously to the rotation blocking body such that it has the tendency to transition into the rotation blocking position, so that this force action upon the actuating body can also persist when it is in the releasing position, since in the releasing position the locking device prevents the rotation movement of the actuating body due to the force application.

In particular, it is provided in the solution according to the invention that, in the releasing position of the actuating body, the releasing position locking device transitions independently into the locking position when the pivot bearing body has left the rotation position corresponding to the operating position.

In particular, it is provided in the solution according to the invention that, on reaching at least one functional position of the trailer coupling, the releasing position locking device transitions from the locking position into the locking releasing position and thus again frees the movement of the actuating body, in particular, in the direction of its rotation blocking position.

In particular, the functional position does not therein represent the rest position of the trailer coupling, but is a position comprising the operating position.

In the simplest case, the functional position is that of the operating position of the trailer coupling, so that it is ensured that the releasing position locking device always transitions, in the operating position, from the locking position into the locking releasing position and thus the rotation blocking device is active in the operating position.

Therein, the transition from the locking position into the locking releasing position could take place by detecting a wide variety of variables influencing the function of the trailer coupling.

For example, the position of the ball neck, in particular the operating position of the ball neck could be detected electronically and then the transition of the releasing position locking device from the locking position into the locking releasing position could be fed in electronically.

The individual functional positions of the trailer coupling can be detected particularly simply in that a rotation position of the pivot bearing body is detected, so that the releasing position locking device transitions, dependent upon at least one particular rotation position of the pivot bearing body, from the locking position into the locking releasing position.

It is therein particularly advantageous if, on reaching at least one predetermined rotation position of the pivot bearing body, the releasing position locking device transitions from the locking position into the locking releasing position, that is, that it can thereby easily be specified from which rotation position of the pivot bearing body the releasing position locking device should transition from the locking position to the locking releasing position.

With regard to functional reliability, it has proved to be particularly favorable if the releasing position locking device transitions in a mechanically controlled manner from the locking position into the locking releasing position on reaching the at least one predetermined rotation position of the pivot bearing body.

By means of the mechanical control of the transition from the locking position into the locking releasing position, a particularly high level of functional reliability is ensured, since a substantial safety aspect is that, in the operating position, the rotation blocking device always transitions independently into the rotation blocking position and remains therein.

With regard to the design of the releasing position locking device, so far no further details have been given.

Thus, an advantageous embodiment provides that the releasing position locking device comprises a locking body guided in a locking direction in the actuating body or in the pivot bearing unit, and, provided in the pivot bearing unit or in the actuating body, a locking receptacle in which the locking body engages in the locking position and is out of engagement in the locking releasing position.

Such a mechanical solution is both simple in construction and also extremely space-saving.

It is particularly favorable if the locking body is arranged in the actuating body guided in the locking direction and the locking receptacle is arranged in the guide body.

In order to be able to detect the rotation positions of the pivot bearing body in a mechanical construction of this type, it is preferably provided that a probe is arranged in the locking receptacle which detects the existence of rotation positions of the pivot bearing body relative to the guide body and can thus mechanically recognize the rotation positions of the pivot bearing body relative to the guide body.

In particular, this can advantageously be realized in that the probe scans, with a probe head, a contour which is arranged on the pivot bearing body and is movable together with the pivot bearing body to detect the individual rotation positions of the pivot bearing body.

In order, on reaching the desired rotation positions, to be able then to move the locking body by simple means from the locking position into the locking releasing position, it is preferably provided that, in at least one predetermined rotation position of the pivot bearing body, the probe displaces the locking body out of the locking receptacle and thereby moves it from the locking position into the locking releasing position.

With regard to the locking direction of the locking body, no further details have so far been given.

For example, the locking body and the locking receptacle could be oriented so that the locking direction extends radially to the pivot axis.

However, a solution configured for particularly favorable construction provides that the locking body is movable in a locking direction extending parallel to the pivot axis.

The description above of solutions according to the invention thus comprises, in particular, the different feature combinations defined by the following sequentially numbered Features:

Feature 1. A trailer coupling comprising a ball neck (10) which is movable between an operating position (A) and a rest position (R) with a pivot bearing body (14) arranged on a first end (12) and a coupling ball (18) arranged on a second end (16), a pivot bearing unit (20) fixedly arranged on a vehicle, by means of which pivot bearing unit the pivot bearing body (14) is accommodated to be pivotable about a pivot axis (22) between the operating position (A) and the rest position (R), a rotation blocking device (50) which, in the operating position, in a rotation blocking position, blocks a pivot movement of the pivot bearing body (14) about the pivot axis (22) and, in a releasing position, frees the pivot movement of the pivot bearing body (14), and a rest position locking device (270) which, in an inactive position, permits a movement of the pivot bearing body (14) relative to the pivot bearing unit (20) and, in a locking position, non-rotatably fixes the pivot bearing body (14) relative to the pivot bearing unit (20) in the rest position, wherein associated with the rest position locking device (270) is a detector unit (277) which detects at least one active position of the rest position locking device (270).

Feature 2. The trailer coupling according to feature 1, wherein the detector unit (277) also detects an inactive position of the rest position locking device (270).

Feature 3. The trailer coupling according to feature 1 or 2, wherein the detector unit (277) contactlessly detects the at least one position of the rest position locking device (270).

Feature 4. The trailer coupling according to one of the preceding features, wherein the detector unit (277) detects the at least one position of the rest position locking device (270) by means of a magnetic field influenced by the at least one position of the rest position locking device (270).

Feature 5. The trailer coupling according to feature 4, wherein the detector unit (277) has a magnetic field sensor (278).

Feature 6. The trailer coupling according to feature 5, wherein the magnetic field sensor (278) detects a magnetic field of a magnet which is movable by means of the movement of the rest position locking device (270).

Feature 7. The trailer coupling according to feature 5, wherein the magnetic field sensor (278) detects a magnetic field of a magnet (289) statically associated with it and influenced by the positions of the rest position locking device (270).

Feature 8. The trailer coupling according to one of the preceding features, wherein the detector unit (277) detects at least the active position of the rest position locking device (270) through a covering of the pivot bearing unit (20), said covering overlapping the rest position locking device (270).

Feature 9. The trailer coupling according to one of the preceding features, wherein the rest position locking device (270) is independent of the rotation blocking device (50).

Feature 10. The trailer coupling according to one of the preceding features, wherein, on reaching the pivot position of the pivot bearing body (14) corresponding to the rest position (R), due to a spring element (276) provided in the rest position locking device, the rest position locking device (270) transitions automatically into the active position.

Feature 11. The trailer coupling according to one of the preceding features, wherein the rest position locking device (270), when it is not in the active position, is always in a locking readiness position.

Feature 12. The trailer coupling according to one of the preceding features, wherein a deactivating unit (280) is provided with which the rest position locking device (270) is transitionable from the active position into the inactive position, independently of the pivot movement of the pivot bearing body (14).

Feature 13. The trailer coupling according to feature 13, wherein the rest position locking device (270) is transitionable by means of the deactivating unit (280), before a pivoting of the pivot bearing body (14) from the rest position (R) into the operating position (A), from the active position into the inactive position.

Feature 14. The trailer coupling according to one of the preceding features, wherein the rest position locking device (270) is transitionable by means of the deactivating unit (280), by means of a drive unit (182) cooperating with the deactivating unit (280), from the active position into the inactive position.

Feature 15. The trailer coupling according to one of the preceding features, wherein the rest position locking device (270) comprises a locking body (274) which is movable from an active position into an inactive position.

Feature 16. The trailer coupling according to feature 16, wherein the locking body (274) arranged on the pivot bearing body (14) or the pivot bearing unit (20) is movable in a locking direction and is bringable, in the active position, into engagement with a locking receptacle (282) arranged in the pivot bearing unit (20) or the pivot bearing body (14).

Feature 17. The trailer coupling according to feature 17, wherein the locking body (274) movable in the locking direction is arranged in the pivot bearing body (14) and wherein the locking receptacle (282) is arranged on the pivot bearing unit (20).

Feature 18. The trailer coupling according to one of the features 17 or 18, wherein associated with the locking receptacle (282) is an actuating body (284) of the deactivating unit (280) which, with the deactivating unit (280) operative, displaces the locking body (274) out of the locking receptacle (282).

Feature 19. The trailer coupling according to one of the preceding features, wherein the trailer coupling has a state evaluating unit (350) which evaluates at least one signal of the detector unit (277) and generates a signal (RS) indicating a secured rest position.

Feature 20. The trailer coupling according to one of the preceding features, wherein the trailer coupling has a securing device (330) which secures the rotation blocking device (50) in the rotation blocking position against a transition into the releasing position.

Feature 21. The trailer coupling according to feature 21, wherein associated with the securing device (330) is a detector (344) which detects a securing or unsecuring position of a securing pin (294) securing the rotation blocking position.

Feature 22. The trailer coupling according to one of the features 20 to 22, wherein the detector (344) of the securing device (330) cooperates with the state evaluating unit (350) and the state evaluating unit (350) generates a signal (AS) indicating a secured rotation blocking position of the rotation blocking device (50).

Feature 23. The trailer coupling according to one of the features 20 to 23, wherein the state evaluating unit (350) only generates the signal (RS) indicating a secured rest position (R) when the detector unit (277) signals the active position of the rest position locking device (270) and also the detector (344) signals the unsecuring position of the securing device (330).

Feature 24. The trailer coupling according to one of the features 20 to 24, wherein the state evaluating unit (350) only generates the signal (AS) indicating a secured operating position (A) when the detector (344) signals the securing position of the securing device (330) and the detector unit (277) signals the inactive position of the rest position locking device (270).

Feature 25. The trailer coupling according to one of the preceding features, wherein the rotation blocking device (50) has at least two rotation blocking bodies (54) which are movably guided by means of a guide body (40) in a guiding direction (58), wherein in the operating position (A), the rotation blocking bodies

(54) are bringable into a rotation blocking position by way of a movement in the guiding direction (58) and therein are each in engagement with a receptacle (60) in the pivot bearing body (14) in order to block a pivot movement of the pivot bearing body (14) about the pivot axis (22) relative to the guide body (40) and are bringable into a releasing position and therein are out of engagement with the respective receptacle (60), and the rotation blocking device (50) comprises an actuating body (52) having a pressure surface (66) extending transversely to the guiding direction (58) for each of the rotation blocking bodies (54), by means of the movement of which in an actuating direction (72), the at least two rotation blocking bodies (54) are movable and urgeable in the guiding direction (58).

Feature 26. The trailer coupling according to feature 26, wherein the rotation blocking bodies (54) are arranged around the actuating body (52).

Feature 27. The trailer coupling according to one of the features 26 or 27, wherein the actuating body (52) is arranged to be rotatable around the pivot axis (22) and in particular has wedge surfaces (66), extending over an angular range about the pivot axis (22) and varying parallel to the guiding direction (58).

Feature 28. The trailer coupling according to one of the features 26 to 28, wherein the guiding direction (58) extends with at least one component in a direction radial to the pivot axis (22).

Feature 29. The trailer coupling according to one of the features 26 to 29, wherein the rotation blocking body (54) is guided by means of the guide body (40) adjoining the pivot bearing body (14) in a radial direction.

Feature 30. The trailer coupling according to one of the features 26 to 30, wherein the guide body (40) has a guide sleeve (44) with the guiding receptacle (56) for the respective rotation blocking body (54).

Feature 31. The trailer coupling according to one of the features 26 to 31, wherein the guide body (40) movably guides the actuating body (52).

Feature 32. The trailer coupling according to one of the features 26 to 32, wherein the guide body (40) forms a pivot bearing for the pivot bearing body (14).

Feature 33. The trailer coupling according to one of the features 26 to 33, wherein the guide body (40) is part of the pivot bearing unit (20) fixedly arranged on a vehicle.

Feature 34. The trailer coupling according to one of the features 26 to 34, wherein the actuating body (52) is surrounded by the guide body (40) and wherein, in particular, the pivot bearing body (14) embraces the guide body (40).

Feature 35. The trailer coupling according to one of the preceding features, wherein pivot bearing body (14) forms an outer body externally surrounding the pivot bearing unit (20), said outer body being arranged non-displaceably relative to the pivot bearing unit (20) in the direction of the pivot axis (22) and wherein, in particular, the first end of the ball neck (10) is fixed to the outer body (14).

Feature 36. The trailer coupling according to one of the preceding features, wherein the pivot bearing body (14) forms an outer body externally surrounding a partial region of the rotation blocking device (50), said outer body being arranged non-displaceably relative to the guide body (40) in the direction of the pivot axis (22).

Further features and advantages of the solution according to the invention are the subject matter of the following description and of the illustration in the drawings of an exemplary embodiment.

BRIEF DESCRIPTION OF THE DRAWINGS

FIGS. 19a, 19b, and 19c show different views in the starting position with: FIG. 19a showing a plan view of the ring gear of the planetary gearset from the side of the drive sleeve, FIG. 19b showing a perspective view of the cooperation of the ring gear in the position according to FIG. 19a with the deactivating unit for the rest position locking device and with the rotation blocking device, and FIG. 19c showing a perspective view of the cooperation of the ring gear in the position according to FIG. 19a with a securing device and with the rotation blocking device;

FIGS. 20a, 20b, and 20c show different views in the first position of the ring gear rotated relative to the starting position for releasing the securing device and without any influence on the rotation blocking device, with: FIG. 20a showing a plan view of the ring gear of the planetary gearset from the side of the drive sleeve, FIG. 20b showing a perspective representation of the cooperation of the ring gear in the position according to FIG. 20a with the deactivating unit for the rest position locking device and with the rotation blocking device, and FIG. 20c showing a perspective representation of the cooperation of the ring gear in the position according to FIG. 20a with a securing device and with the rotation blocking device;

FIGS. 21a, 21b, and 21c show different views in a maximally rotated position of the ring gear relative to the starting position without any influence on the rotation blocking device, with: FIG. 21a showing a plan view of the ring gear of the planetary gearset from the side of the drive sleeve, FIG. 21b showing a perspective representation of the cooperation of the ring gear in the position according to FIG. 21a with the deactivating unit for the rest position locking device and with the rotation blocking device, and FIG. 21c showing a perspective representation of the cooperation of the ring gear in the position according to FIG. 21a with a securing device and with the rotation blocking device;

FIGS. 22a, 22b, and 22c show views in a position of the ring gear rotated relative to the starting position on reaching the releasing position of the rotation blocking device, with: FIG. 22a showing a plan view of the ring gear of the planetary gearset from the side of the drive sleeve; FIG. 22b showing a perspective representation of the cooperation of the ring gear in the position according to FIG. 22a with the deactivating unit for the rest position locking device and with the rotation blocking device, FIG. 22c showing a perspective representation of the cooperation of the ring gear in the position according to FIG. 22a with a securing device and with the rotation blocking device;

FIGS. 23a, 23b, and 23c show views in a position rotated relative to the starting position of the ring gear on reaching the rest position of the pivot bearing body, with: FIG. 23a showing a plan view of the ring gear of the planetary gearset from the side of the drive sleeve, FIG. 23b showing a perspective representation of the cooperation of the ring gear in the position according to FIG. 23a with the deactivating unit for the rest position locking device and with the rotation blocking device, and FIG. 23c showing a perspective representation of the cooperation of the ring gear in the position according to FIG. 23a with a securing device and with the rotation blocking device;

DETAILED DESCRIPTION OF THE INVENTION

Figure 1:
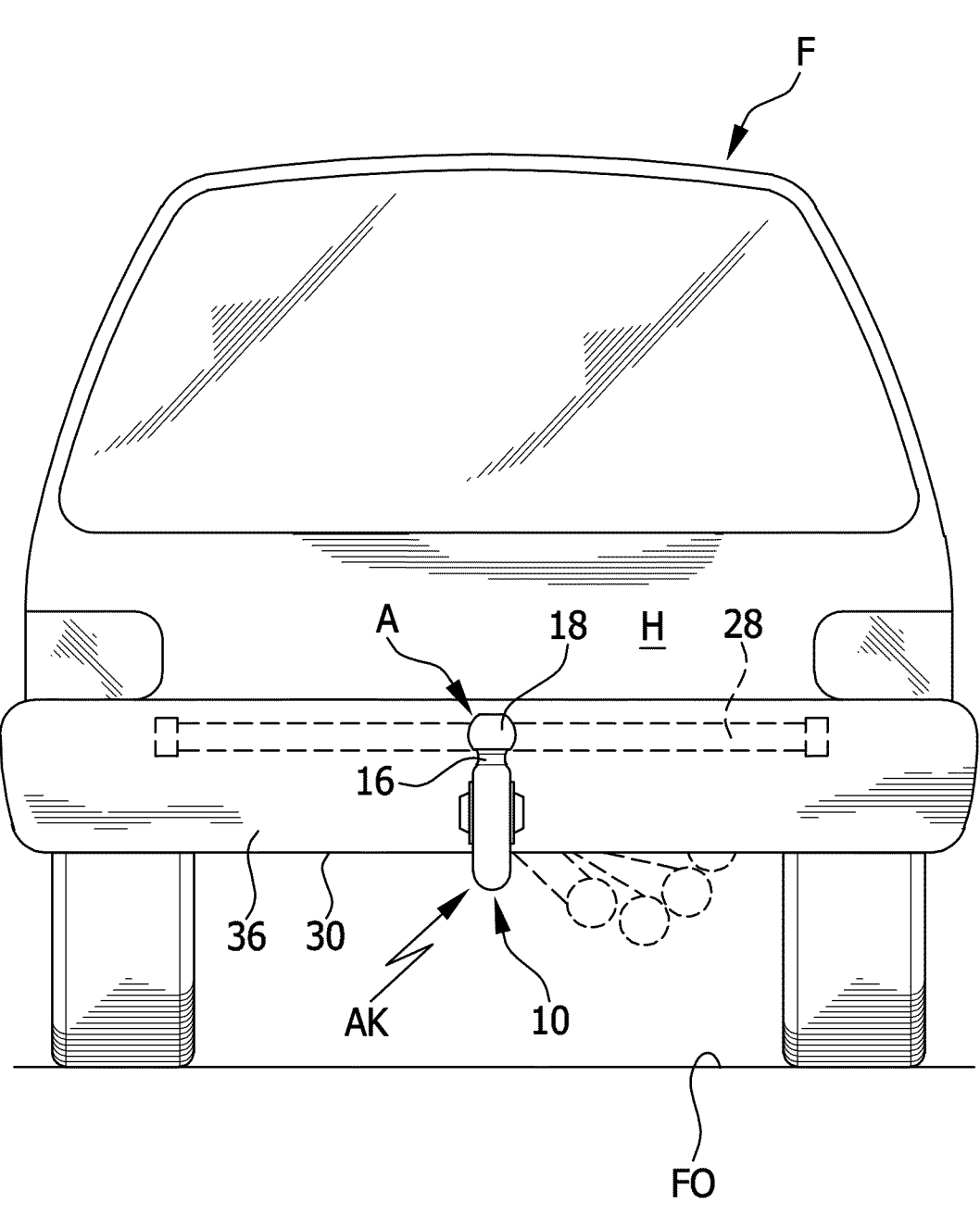
FIG. 1 shows a rear view of a motor vehicle with a trailer coupling according to the invention.
Figure 2:
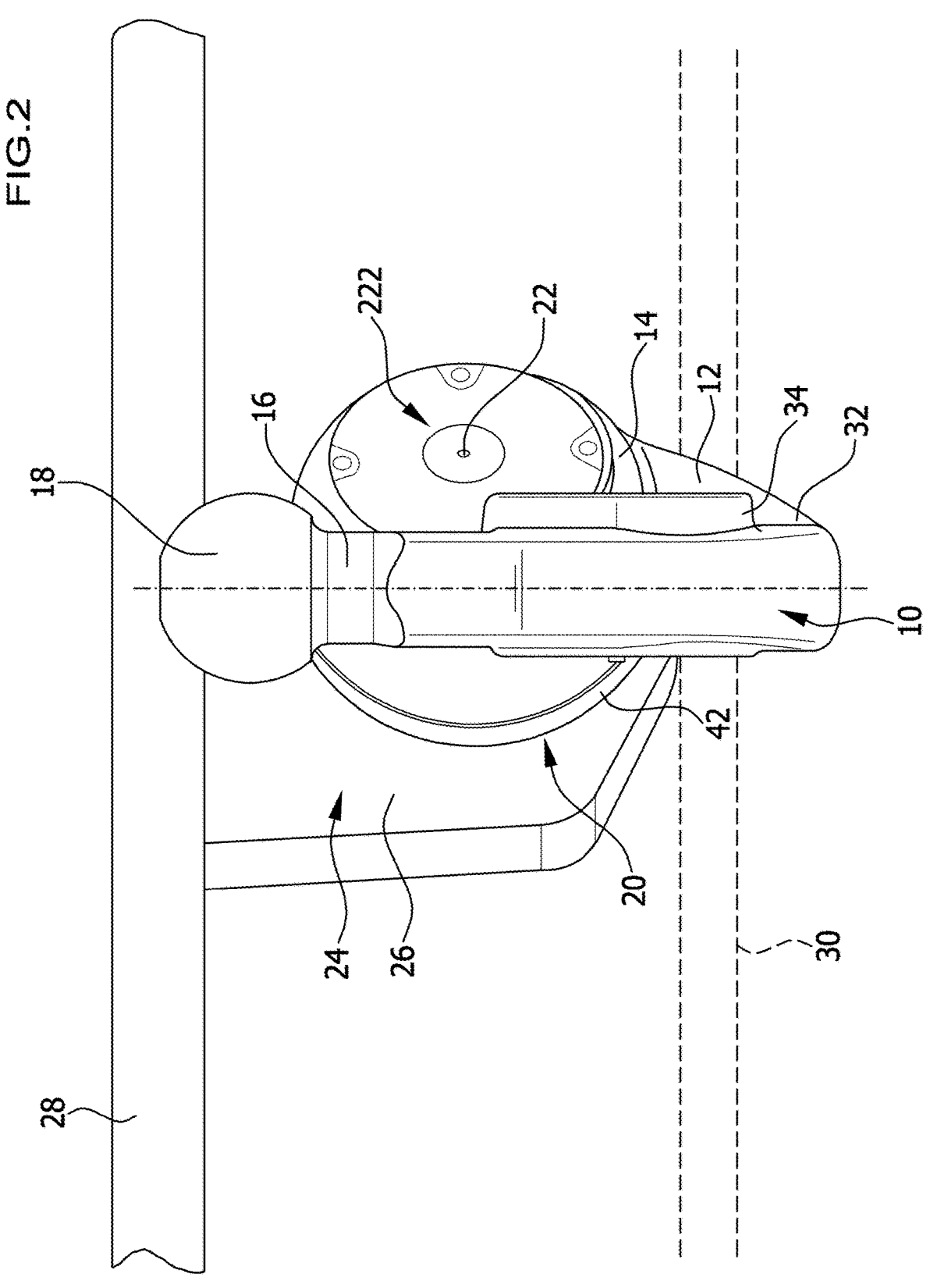
FIG. 2 shows a plan view of a first exemplary embodiment of a trailer coupling according to the invention with a view in the direction of travel of the trailer coupling mounted on a vehicle rear end, wherein the trailer coupling is in its operating position.
Figure 3:
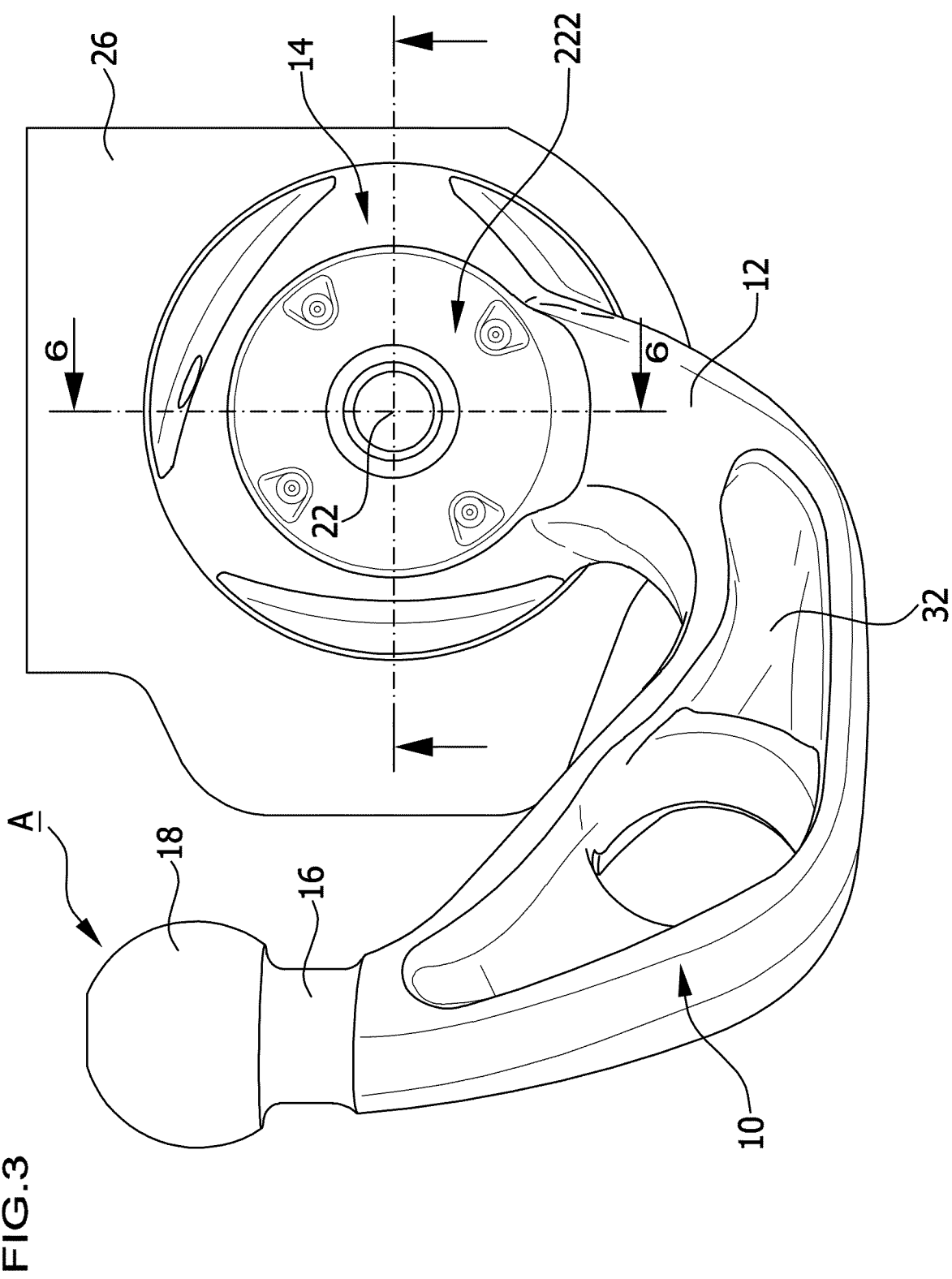
FIG. 3 shows a plan view of the trailer coupling of FIG. 2, in the direction of the pivot axis.
Figure 4:
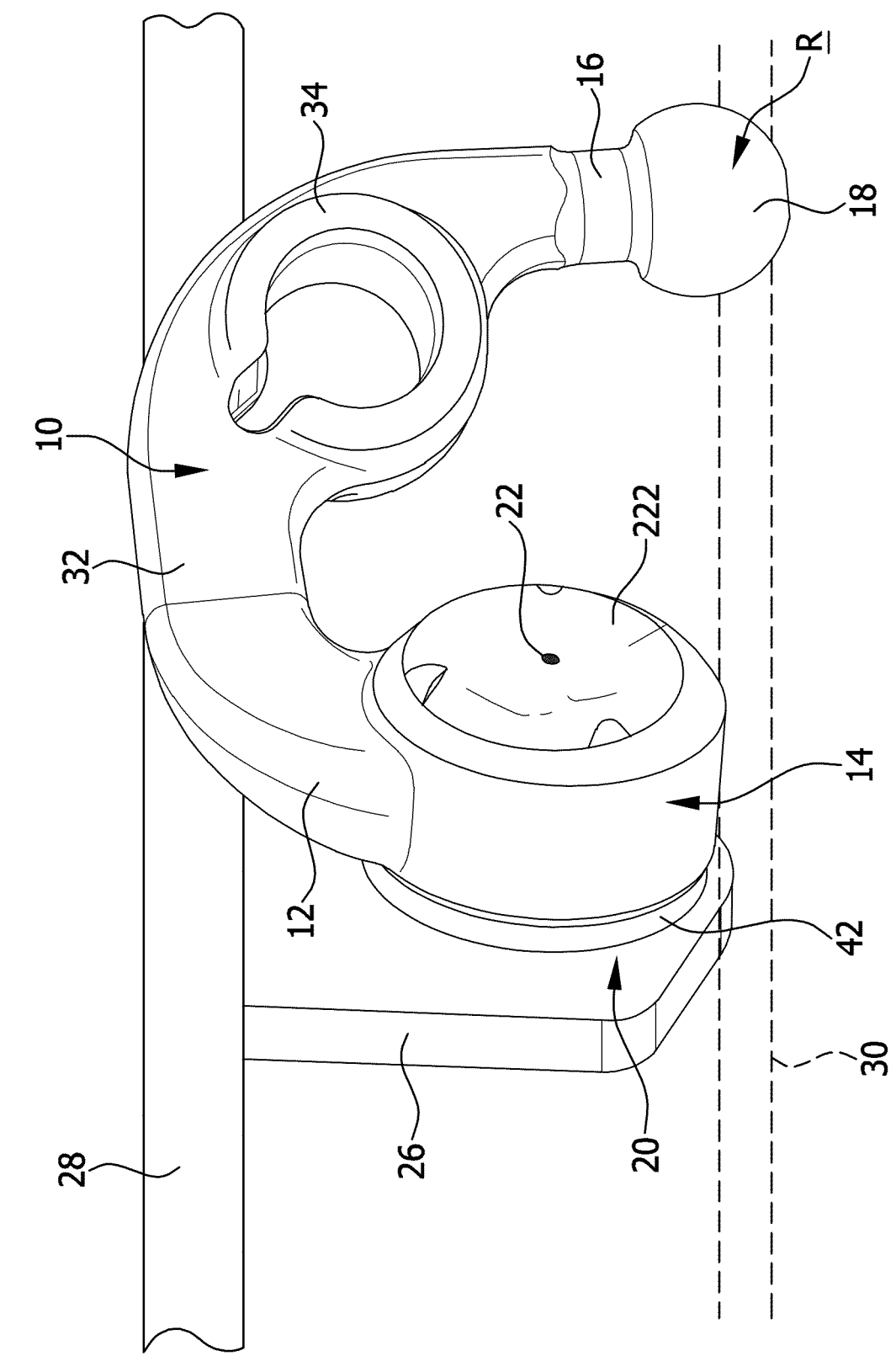
FIG. 4 shows a view according to FIG. 2 of the trailer coupling situated in the rest position.
Figure 5:
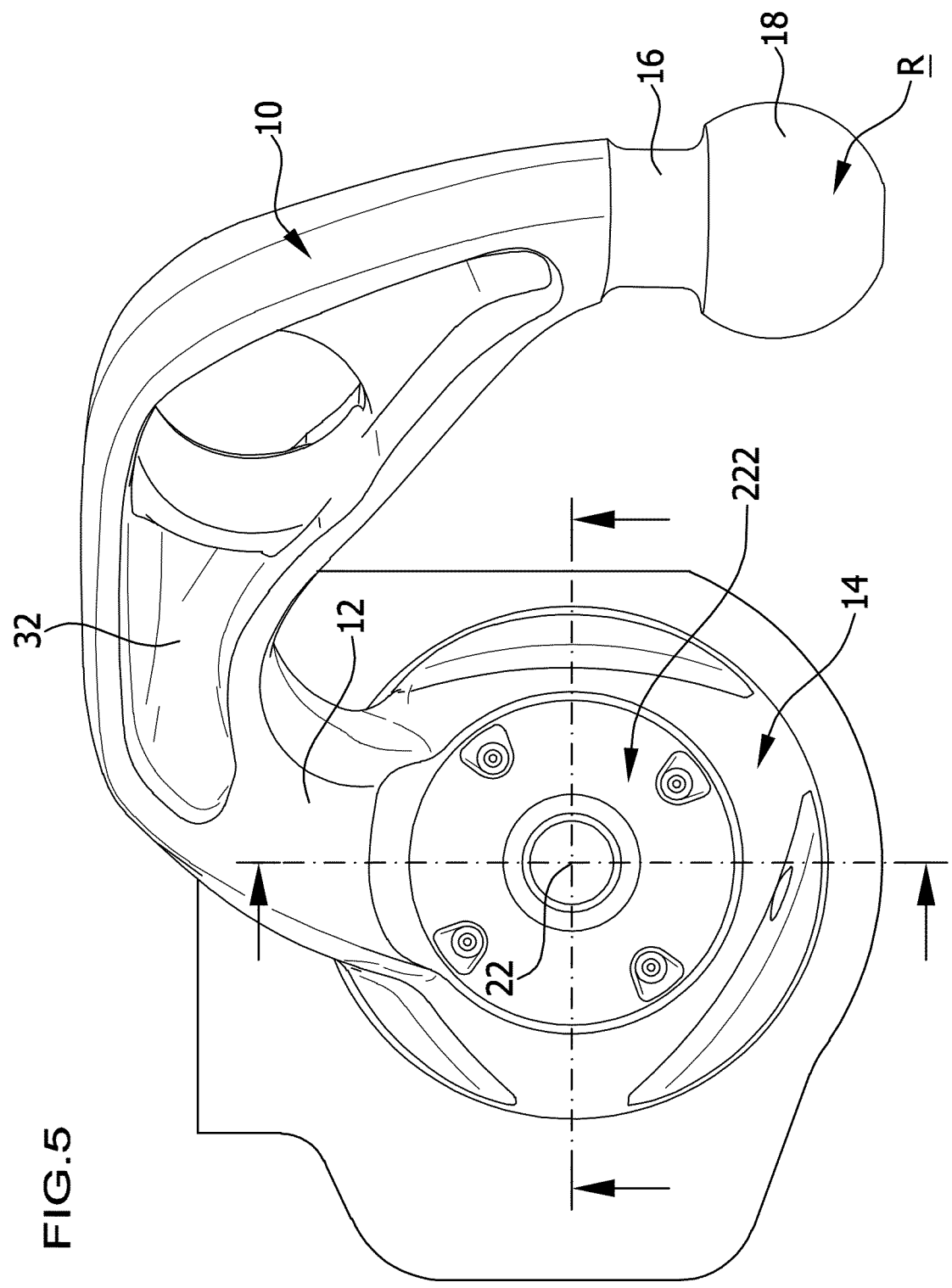
FIG. 5 shows a plan view of the trailer coupling according to the trailer coupling situated in the rest position according to FIG. 4, in the direction of the pivot axis.
Figure 6:
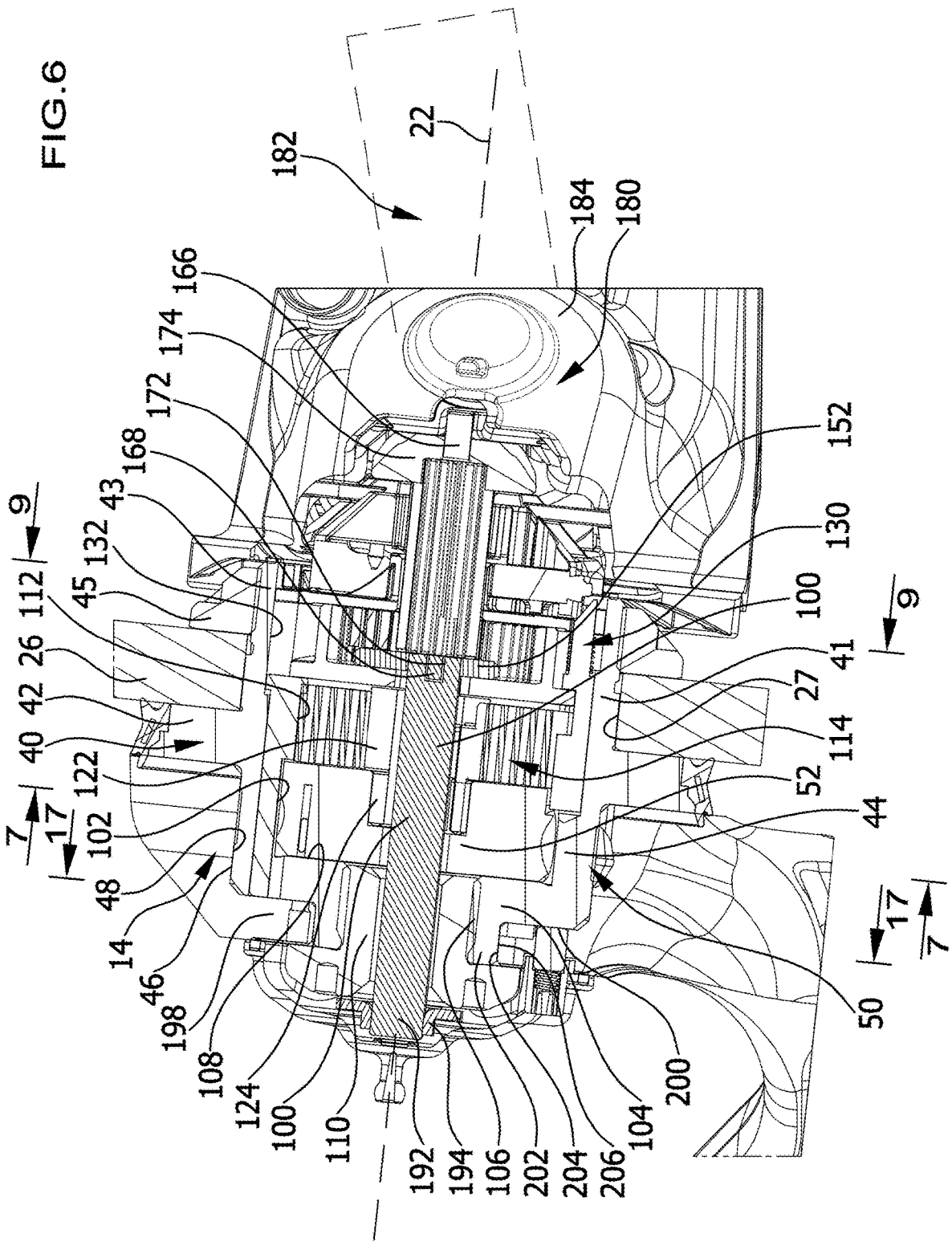
FIG. 6 shows a representation of a section along the line 6-6 in FIG. 3.

A first exemplary embodiment of a trailer coupling AK according to the invention for a motor vehicle, shown in FIGS. 1, 2 and 3 in an operating position A, and in FIGS. 4 and 5, in a rest position R comprises a ball neck identified overall as 10 which is held with a first end 12 on a pivot bearing body 14 and on a second end 16 carries a coupling ball identified overall as 18, on which a coupling ball receptacle of a trailer is fixable.

The pivot bearing body 14 is mounted by means of a pivot bearing unit identified overall as 20, which is pivotable about a pivot axis 22 relative to a carrier 24 fixedly arranged on a vehicle, wherein the carrier 24 preferably has a mounting plate 26 holding the pivot bearing unit 20, said mounting plate preferably extending in a plane perpendicular to the pivot axis 22, and has a transverse carrier 28 fixedly arranged on a vehicle, said transverse carrier being fastenable in a known manner on a rear region H of a vehicle bodywork F, specifically so that the pivot bearing unit 20 and the carrier 24 lie covered on a side facing away from a roadway surface FO of a lower edge 30 of a fender unit 36 and are covered by the fender unit 36 (FIG. 2).

In the operating position shown in FIGS. 1 and 2, the ball neck 10, with a portion 32 adjoining the first end 12, reaches under the lower edge 30 of the fender unit 36 so that the second end 16 and the coupling ball 18 together with a socket receptacle 34 are arranged on a side of the rear fender unit 36 facing away from the vehicle bodywork F, while in the rest position, both the pivot bearing unit 20 and also the entire ball neck 10 together with the coupling ball 18 are concealed from view from behind by the rear fender unit 36.

As shown in FIGS. 6 to 9, the pivot bearing unit 20 comprises a guide body 40 which is fixedly connected by a flange 42 to the mounting plate 26 and a guide sleeve 44 which extends, starting from the flange 42, away from the mounting plate 26, on which guide sleeve the pivot bearing body 14 is rotatably mounted.

For this purpose, the guide sleeve 44 comprises a cylindrical outer shell surface 46 which the pivot bearing body 14 abuts with a cylindrical inner surface 48 and thereby experiences about the pivot axis 22 a rotary guidance about the axis 22, so that the pivot bearing body 14 is rotatable relative to the guide body 40 such that the ball neck 10 is pivotable from the operating position A into the rest position R and vice versa.

The guide body 40 also comprises a projection 41 extending through an aperture 27 in the mounting plate 26, said projection carrying a receptacle 43, following the projection 41 on a side opposite to the flange 42, for a retaining ring 45 which is fixable to said receptacle, so that by means of the projection 41, the guide body 40 is seated in a positive-locking manner non-rotatably in the mounting plate 26 due to its not rotationally symmetrical, but rather radially varying outer contour 47 (FIG. 9), in the correspondingly formed aperture 27 and by means of the flange 42 and the retaining ring 45 which abut opposite sides of the mounting plate 26, is fixed to said mounting plate.

The guide body 40, by means of its fixed connection to the carrier plate 26 and the carrier 24 thereby forms the rotational mounting for the pivot bearing body 14 fixedly arranged on a vehicle.

For fixing the pivot bearing body 14 in the operating position A, the pivot bearing unit 20 is provided with a rotation blocking device (FIG. 7) identified overall as 50, which comprises an actuating body 52, a plurality of rotation blocking bodies 54 which can be acted upon by the actuating body 52, of which each is movably guided in a guiding receptacle 56 of the guide sleeve 44 in a guiding direction 58 extending substantially radially to the pivot axis 22, and receptacles 60 extending, starting from the inner surface 48 of the pivot bearing body 14, into said pivot bearing body, with which receptacles the rotation blocking bodies 54 are bringable into engagement in the operating position A, wherein the receptacles 60 have wall surfaces having an increasingly smaller spacing from one another in the radial direction to the pivot axis 22.

Figure 7:
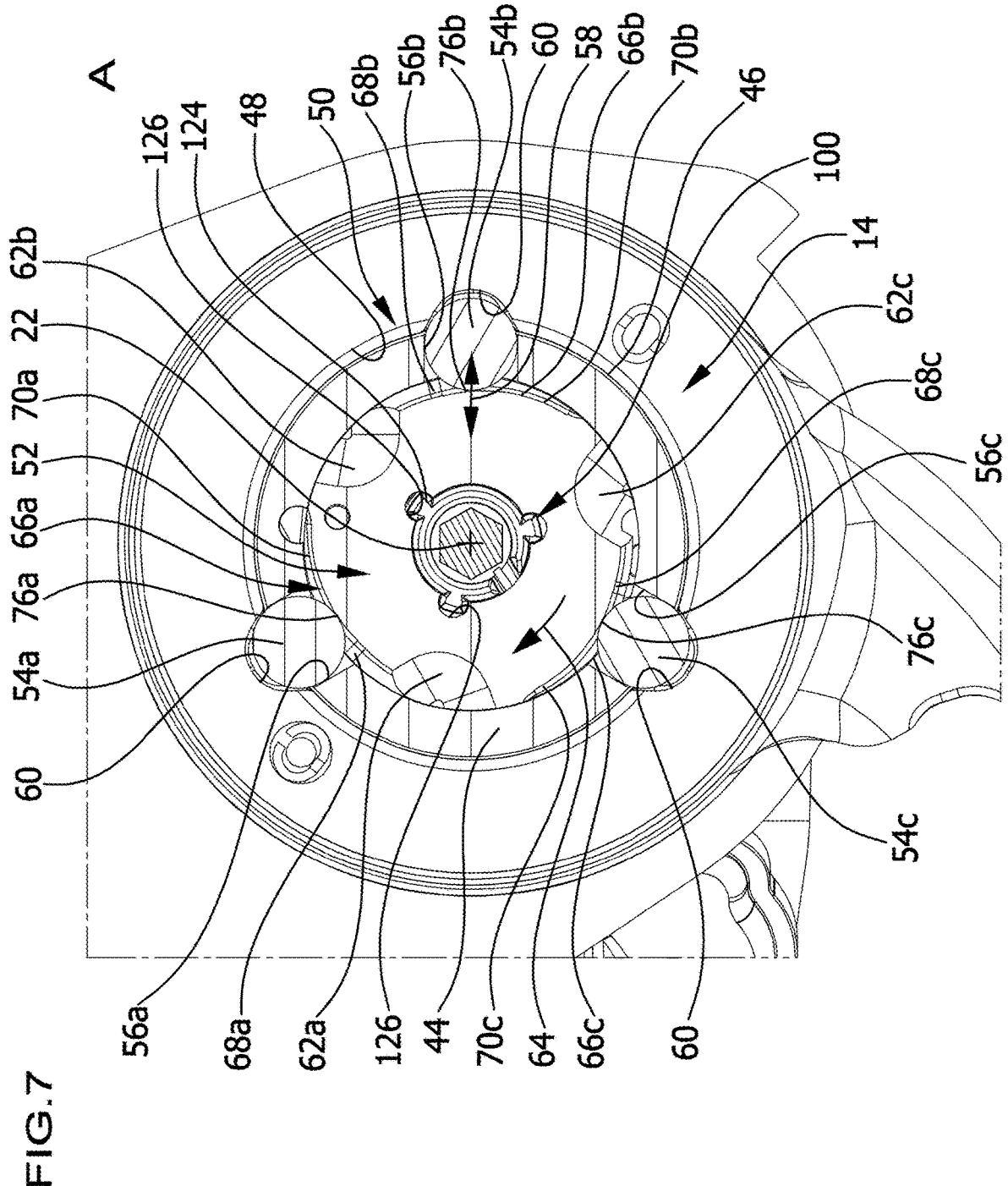
FIG. 7 shows a section along the line 7-7 in FIG. 6 in the operating position.
Figure 9:
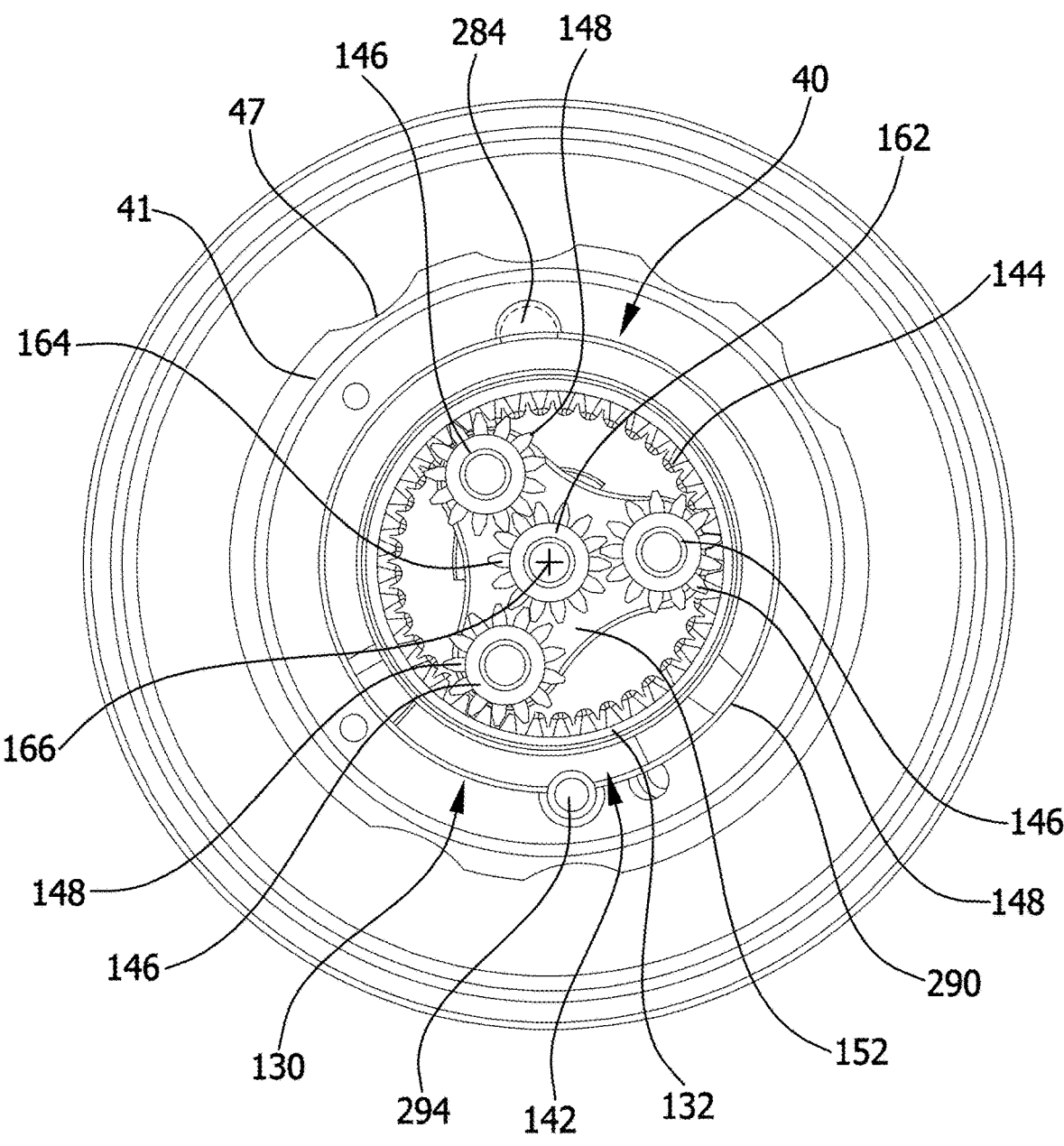
FIG. 9 shows a section along the line 9-9 in FIG. 6 without the mounting plate and retaining ring.

If, for example, as shown in FIG. 7 and FIG. 9 for the first exemplary embodiment, the rotation blocking device 50 comprises a set of three rotation blocking bodies 54*a*, 54*b*, 54*c*, then the guide sleeve 44 has a corresponding set of three guiding receptacles 56*a*, 56*b*, 56*c* in which the rotation blocking bodies 54*a*, 54*b*, 54*c* are displaceably guided in the guiding direction 58 extending substantially radially to the pivot axis 22, and the pivot bearing body 14 is provided with a set of first receptacles 60*a*, 60*b*, 60*c* with which the rotation blocking bodies 54*a*, 54*b*, 54*c* are bringable into engagement in the operating position A.

For suitable moving and positioning of the rotation blocking bodies 54 in the guiding direction 58, the actuating body 52 is provided with a set of altogether three retraction receptacles 62*a*, 62*b*, 62*c* corresponding to the number of rotation blocking bodies 54 and three pressure surfaces 66*a*, 66*b*, 66*c* adjoining the retraction receptacles 62*a*, 62*b*, 62*c* in a circumferential direction 64, said pressure surfaces being constructed as wedge surfaces acting radially to the pivot axis 22, wherein in their releasing position, the rotation blocking bodies 54 can enter into the retraction receptacles 62*a*, 62*b*, 62*c* so far (FIG. 8) that they no longer protrude beyond the outer shell surface 46 of the guide sleeve 44, and wherein the pressure surfaces 66*a*, 66*b*, 66*c* each extend from a radially inwardly situated start region 68*a*, 68*b*, 68*c* directly adjoining the respective retraction receptacles 62, with increasing extent in the circumferential direction 64, increasingly radially outwardly relative to the pivot axis 22, as far as a radially outwardly situated end region 70*b*, 70*c* and thus act, during a rotation movement of the actuating body 52, on the rotation blocking bodies 54 as wedge surfaces in order to move them into their rotation blocking position.

Preferably, the pressure surfaces 66 therein run as a spiral or involute segment relative to the pivot axis 22.

Figure 8:
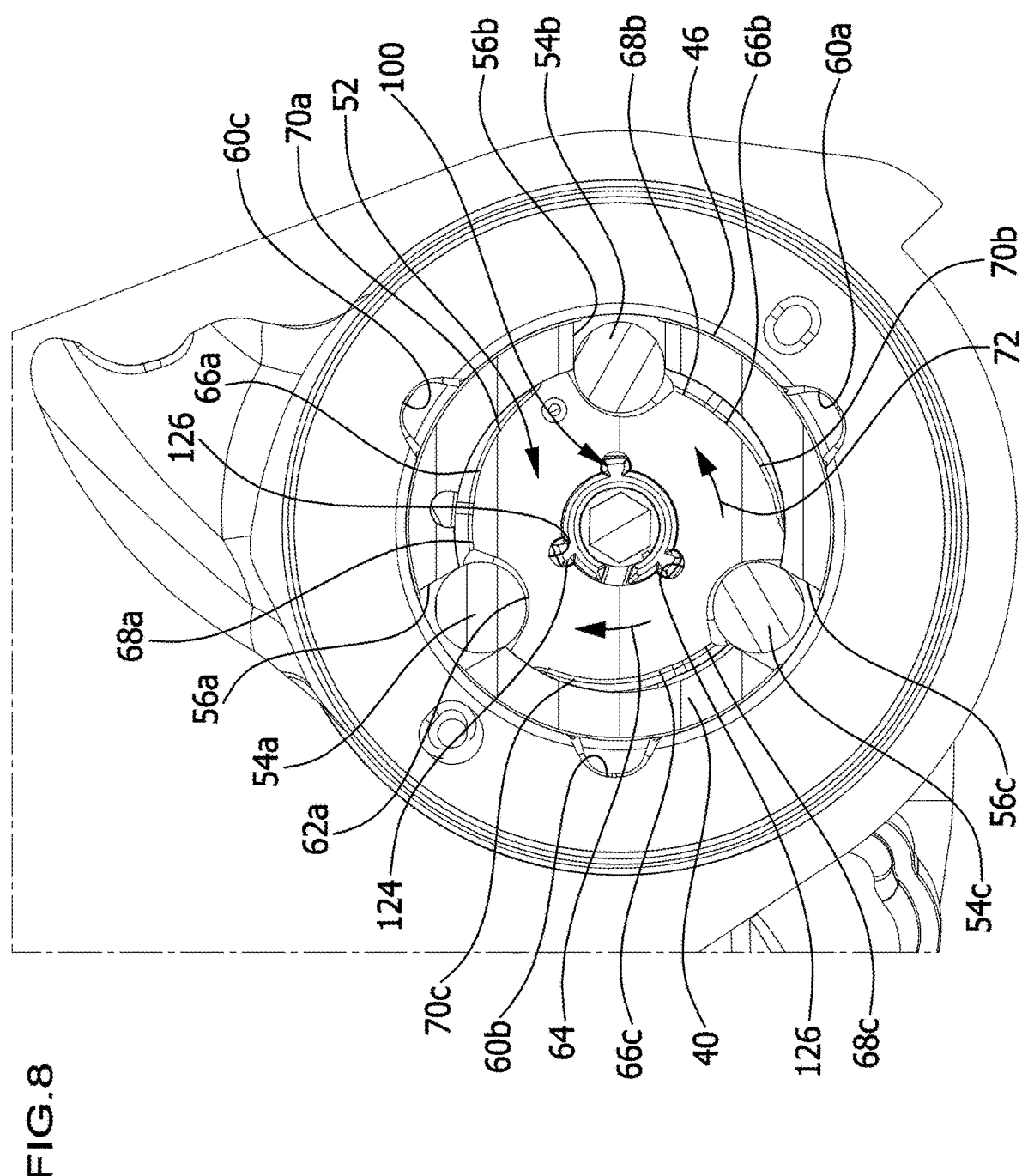
FIG. 8 shows a representation of a section similar to FIG. 7 in the rest position.

In order to hold the rotation blocking bodies 54 either in their rotation blocking position by acting thereupon with the pressure surfaces 66 between the start region 68 and the end region 70 or to permit them, in the releasing position, to enter into the retraction receptacle 62, the actuating body 52 is also rotatable about the pivot axis 22, in particular coaxially therewith, specifically such that either the set of retraction receptacles 62*a*, 62*b*, 62*c* faces toward the rotation blocking bodies 54 and gives them the possibility, as shown in FIG. 8 in its inactive position, of entering the retraction receptacles 62 in the direction radially to the pivot axis 22, in order to provide to the respective rotation blocking bodies 54 the possibility of freeing the first receptacles 60 together with the pivot bearing body 14 with regard to a rotation about the pivot axis 22 relative to the guide body 40, so that the pivot bearing body 14 with the ball neck 10 is unhindered and freely rotatable relative to the guide sleeve 44, as shown in FIG. 8, wherein in this case, the rotation blocking bodies 54 do not extent beyond the outer shell surface 46 of the guide sleeve 44.

A rotation of the actuating body 52 with the rotation blocking bodies 54 seated in the retraction receptacles 62 in a rotation direction 72 contrary to the rotation direction 64 causes the rotation blocking bodies 54 to be moved out of the retraction receptacles 62 and then, in the active position of the actuating body 52, to be seated on the start regions 68 of the pressure surfaces 66, but for example to enter into the first receptacles 60 and thereby to prevent the free rotatability of the pivot bearing body 14 relative to the guide body 40.

If the actuating body 52 is further rotated in the rotation direction 72 contrary to the circumferential direction 64, regions of the pressure surfaces 66 lying ever further radially outwardly relative to the pivot axis 22 act upon the rotation blocking bodies 54 and thus, in the operating position A of the ball neck 10, press the rotation blocking bodies 54 increasingly into the first receptacles 60*a*, 60*b*, 60*c* (FIG. 7) in order thereby to achieve a substantially play-free fixing of the pivot bearing body 14 relative to the guide body 40, in this case the guide sleeve 44.

In the rotation blocking position of the rotation blocking bodies 54, the actuating body 52 is in its active position so that the rotation blocking bodies 54, as FIG. 7 shows, lie approximately on central regions 76 situated between the start regions 68 and the end regions 70 of the pressure surfaces 66 and are acted upon by them.

In order to provide the possibility to the actuating body 52 of optimally acting upon each of the three rotation blocking bodies 54, it is provided that in the active position, a centering of the actuating body 52 according to the position of the rotation blocking bodies 54 takes place. In particular, the actuating body 52 is mounted in the guide sleeve 44 such that, due to the radial play, the actuating body 52 can center itself according to the position, dependent upon manufacturing tolerances, of the rotation blocking bodies 54 within the guide body 40, wherein the self-centering of the actuating body 52 can deviate slightly from a coaxial arrangement relative to the geometric pivot axis 22.

Due to the self-centering, the rotation blocking bodies 54*a*, 54*b* and 54*c* act with approximately equal forces in the respective guiding direction 58*a*, 58*b*, 58*c* on the receptacles 60*a*, 60*b*, 60*c* so that the reaction forces acting upon the actuating body 52 are approximately equal.

In the illustrated exemplary embodiment of the solution according to the invention, the rotation blocking bodies 54 are arranged in the guiding receptacles 56 at equal angular spacings about the pivot axis 22, so that the approximately equal reaction forces due to the self-centering on one of the rotation blocking bodies 54*a*, 54*b*, 54*c* act in equal proportions on the other rotation blocking bodies 54*b* and 54*c*, 54*a* and 54*c*, and on 54*a* and 54*b* and thus cancel each other out overall, so that the actuating body 52 is in an equilibrium of forces and needs no additional support.

Preferably, the rotation blocking bodies 54 are constructed as spheres which therefore, on one side, abut the actuating body 52 and, on the other side, also abut the receptacles 60.

Thus, only a play-laden rotatable mounting of the actuating body relative to the pivot axis 22 takes place which is primarily relevant when the actuating body 52 holds the rotation blocking bodies 54 in a releasing position in which the rotation blocking bodies 54 enter into the retraction receptacles 62 of the actuating body 52.

In order to cause the actuating body 52 always to move without external influence in the rotation direction 72, wherein the rotation blocking bodies 54 move in the direction of the rotation blocking position, the actuating body 52 is acted upon by a torsional spring 114 (FIG. 6) which, on one side, acts upon the actuating body 52 and, on the other side, is supported radially outwardly on the guide body 40.

The torsional spring 114 also causes the actuating body 52 to press the rotation blocking bodies 54 with application of force into the receptacles 60 and thus the pivot bearing body 14 is fixed in a play-free manner, wherein the freedom from play is also maintained with changing geometry of the receptacles 60 due to the loads during operation by means of a further rotation of the actuating body 52 in the rotation direction 72.

The guide sleeve 44 extends with a portion forming a receptacle 102 for the actuating body 52 between the flange 42 and a flange 104 closing the guide sleeve 44 and extending radially toward the pivot axis 22, said latter flange preferably being formed integrally on the guide sleeve 44 and bordering the receptacle 102 for the actuating body 52, so that the actuating body 52 is guided radially to the pivot axis 22 by the receptacle 102 of the guide sleeve 44 and is guided axially in the direction of the pivot axis 22 by abutting an inner side 108 of the flange 104.

The flange 104 further has a receptacle 106 coaxial with the pivot axis 22 in which an insert 110 penetrated by a pivot drive shaft 100 is placed, in particular screwed in, and is seated in the receptacle 106.

On a side of the receptacle 102 for the actuating body 52 opposite the flange 104, the guide sleeve 44 forms, for example with a portion penetrating the flange 42, a torsional spring receptacle 112 in which the torsional spring 114 is arranged adjoining the actuating body 52, said spring being fixed on one side with an outer end in the torsional spring receptacle 112 and with an inner end is connected to a drive sleeve 122 which is non-rotatably coupled to the actuating body 52.

Figure 10:
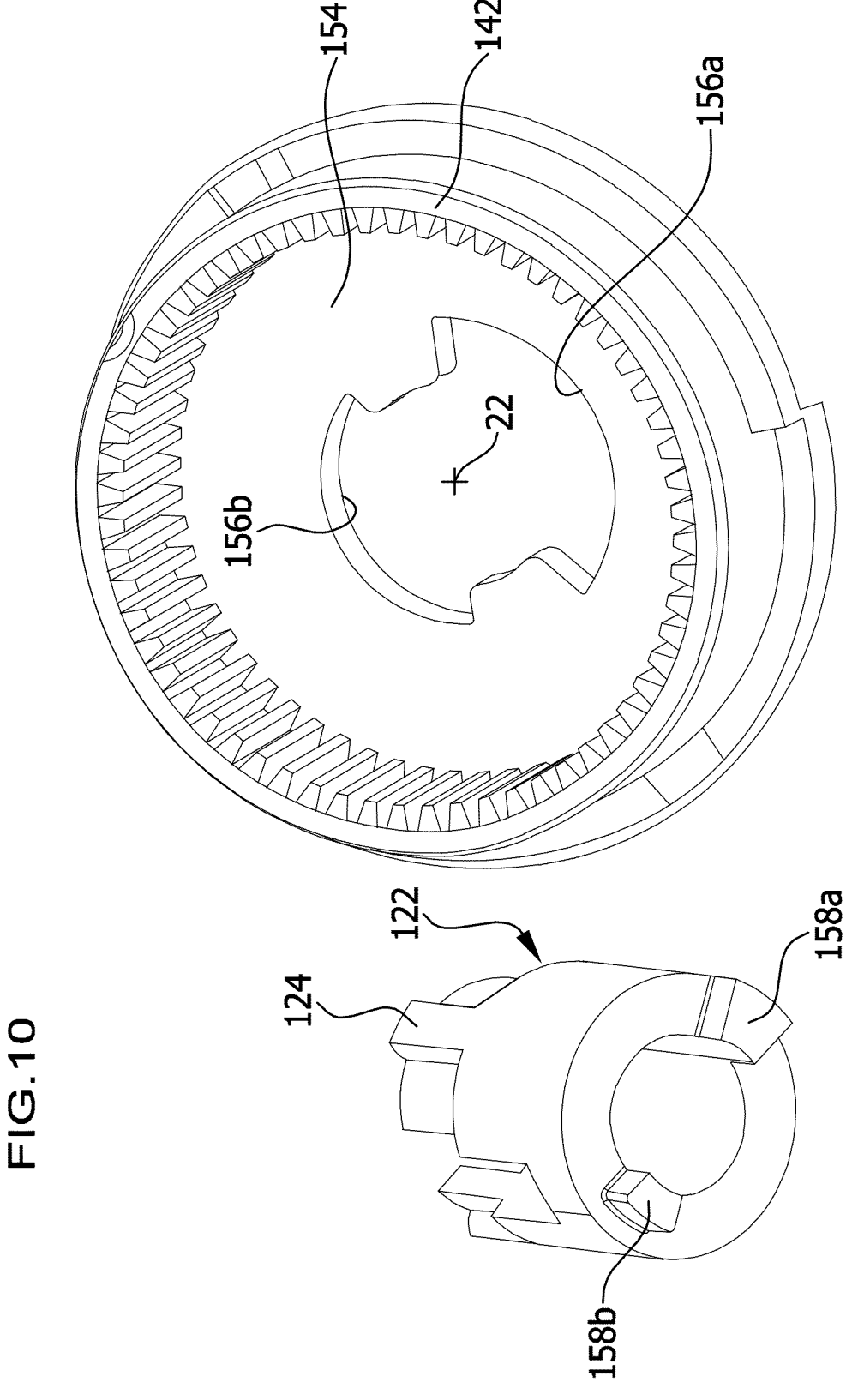
FIG. 10 shows a perspective view of a ring gear and a drive sleeve cooperating therewith.
Figure 11:
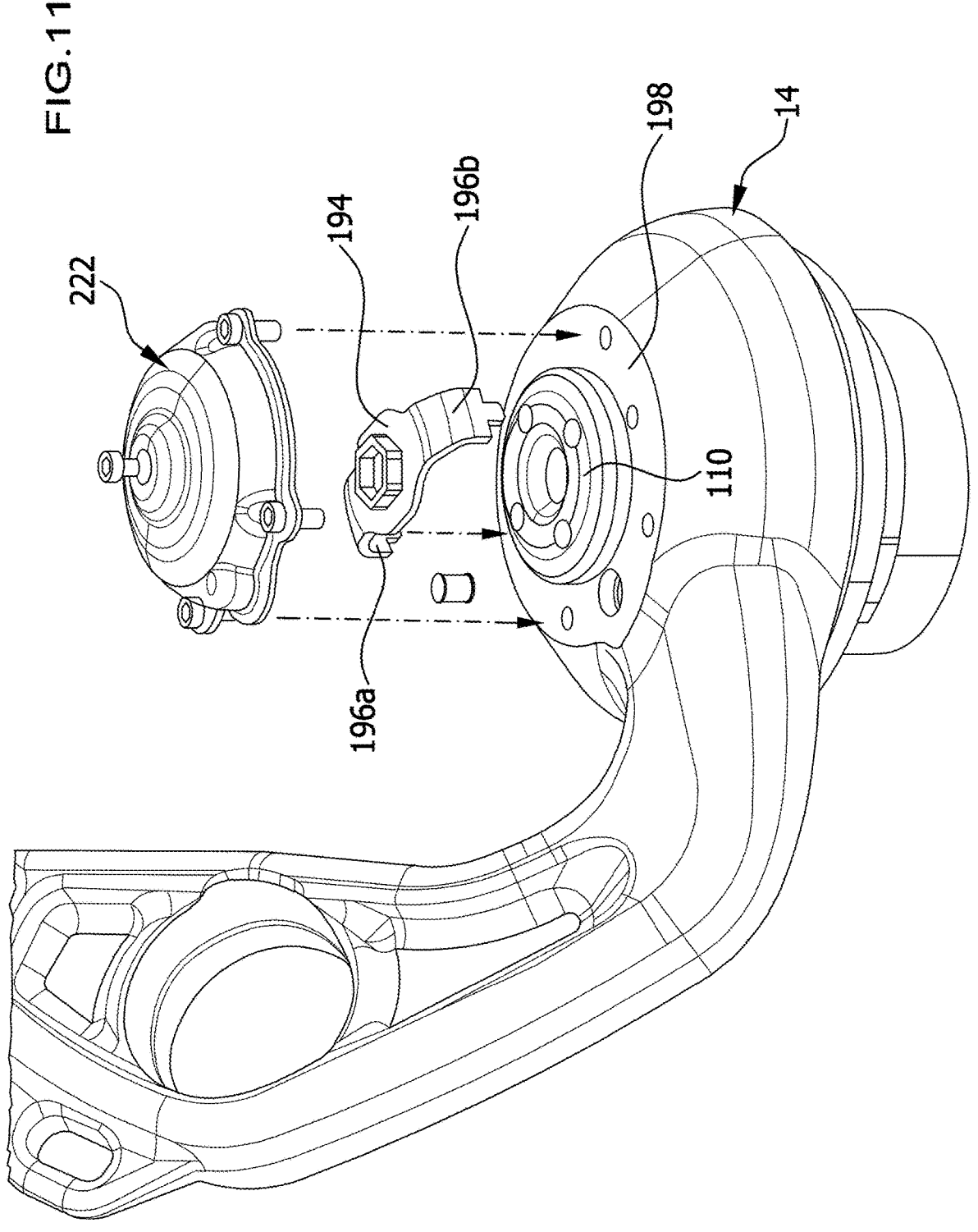
FIG. 11 shows a perspective exploded representation of the pivot bearing body with the covering.

For this purpose, as FIGS. 10 and 11 show, the drive sleeve 122 is provided, for example, with projections 124 which engage in corresponding recesses 126 in the actuating body 52 to create a positive-locking connection.

Since the torsional spring 114 acts upon the drive sleeve 122 which is non-rotatably coupled to the actuating body 52, by means of the influence of the torsional spring 114 on the drive sleeve 122, a driving of the actuating body 52 in the rotation direction 72 takes place so that the actuating body 52 continuously acts upon the actuating body 52 with unhindered influence of the torsional spring 114 on the drive sleeve 122 such that said actuating body has the tendency to press the rotation blocking bodies 54, with application of force, into the receptacles 60 and thus to fix the pivot bearing body 14 non-rotatably relative to the guide sleeve 44 and, in particular, play-free.

In order to be able to move the rotation blocking bodies 54 into the releasing position, an action on the actuating body 52 contrary to the rotation direction 72 and thus contrary to the effect of the torsional spring 114 is necessary.

For this purpose, the drive sleeve 122 is drivable by means of a planetary gearset 130 denoted altogether as 130 (FIG. 6), which is arranged in a transmission receptacle 132 of the guide sleeve 44, in particular coaxially with the pivot axis 22 and which is arranged, for example, partially within the aperture 27 of the carrier plate 26 and preferably extends on a side opposite to the flange 42 away from the aperture 27 of the carrier plate 26.

The planetary gearset 130 (FIG. 9) itself comprises a ring gear 142 which is guided in the transmission receptacle 132 and is provided with an internal toothing 144 with which planet gears 146 engage with their external toothing 148.

Therein, the planet gears 146 are rotatably held on a planet gear holder 152 which itself is non-rotatably connected to the pivot drive shaft 100 so that the planet gear carrier 152 forms an output of the planetary gearset 130 for performing the pivoting of the ball neck 10.

Furthermore—as FIG. 10 shows—the ring gear 142 comprises a flange body 154 arranged between the planet gear carrier 152 and the torsional spring 114 which flange body also extends in the direction of the pivot drive shaft 100, surrounds it, but is rotatable relative thereto and represents an output of the planetary gearset 130 for actuating the rotation blocking device 50.

As FIG. 10 shows, the flange body 154 has circular arcuate drive slots 156a, 156b arranged circumferentially about the pivot axis 22 and cooperating with drive fingers 158a, 158b of the drive sleeve 122 which engage in them, and which are configured such that by means of the difference between the angular region about the pivot axis 22, over which the drive slots 156 extend, and the angular region about the pivot axis 22, over which the drive fingers 158 extend, a free movement of the drive sleeve 122 is possible relative to the ring gear 142, which is explained below in detail.

The planet gears 146 are further in engagement by their external toothing 148 with an external toothing 164 of a sun gear 162 of the planetary gearset 130 which is seated on a drive shaft identified overall as 166, which is arranged coaxially with the pivot axis 22 and, for example, by means of an end-side shaft stub 168, which engages in a front-side bore 172 of the pivot drive shaft 100, is freely rotatable relative to the pivot drive shaft 100, but is mounted coaxially therewith.

The drive shaft 166 carries a drive gearwheel 174 at a spacing from the planetary gearset 130, for example, a bevel gear which is driven by an output gear of a motor drive unit 182 which comprises, for example on one side, a drive motor, preferably an electric motor and, on the other side, a reduction gearing for driving the drive gearwheel.

The drive unit 182 is held, for example, on a cover body 184 which, starting from the carrier plate 126, extends over the drive shaft 166 with the drive gearwheel 174 and the output gearwheel meshing therewith and also mounts the drive shaft 166 on a side facing away from the shaft stub 168.

Thus, the planetary gearset 130 and the drive unit 182 form, for example, inter alia, an actuating device 180 for the rotation blocking device 50.

The pivot drive shaft 100 coupled non-rotatably to the planet gear carrier 152 passes through—as described above—the flange 104 of the guide body 40 and is non-rotatably coupled at one end 192 protruding beyond the insert 110 to a drive body 194 which has two drive arms 196a and 196b which extend in the direction of an end flange 198 of the pivot bearing body 14 which extends over an external region 200 of the flange 104 of the guide body 14 and therein engage in positive-locking manner in recesses therein in order to create a non-rotatable connection between the drive body 194 and the guide body 14.

The end flange 198 therein extends over the flange 104 of the guide body 40 in the external region 200 and extends as far as a guide formation 202 of the flange 104, wherein the end flange 198 embraces, for example, with a radially inwardly situated cylinder surface 204, an outer cylinder surface 206 of the guide formation 202 and, for example, abuts it and also thereby is additionally guided on the guide formation 202 coaxially with the pivot axis 22.

Furthermore, a thread 212 extends in the receptacle 106 of the guide formation 202 into which thread the insert 110 is fixed, in particular screwed, which extends over the end flange 198 partially in a radially inwardly situated region with an outer flange 214, so that the end flange 198 of the pivot bearing body 14 is guided axially non-displaceably between the flange 104 and the outer flange 214 of the insert 110 and thus is guided axially non-displaceably relative to the guide body 40.

Furthermore, non-rotatably mounted on the end flange 198 is a covering 222 which extends over the drive body 194 with the drive arms 196 and forms a bearing receptacle 224 for the end 192 of the guide shaft 100 so that with the pivot bearing body 14, the covering 222 forms a unit which is rotatable about the pivot axis 22 (FIG. 11).

The covering 222 is therein seated on the end flange 198 and is non-rotatably fixed thereto.

Figure 14:
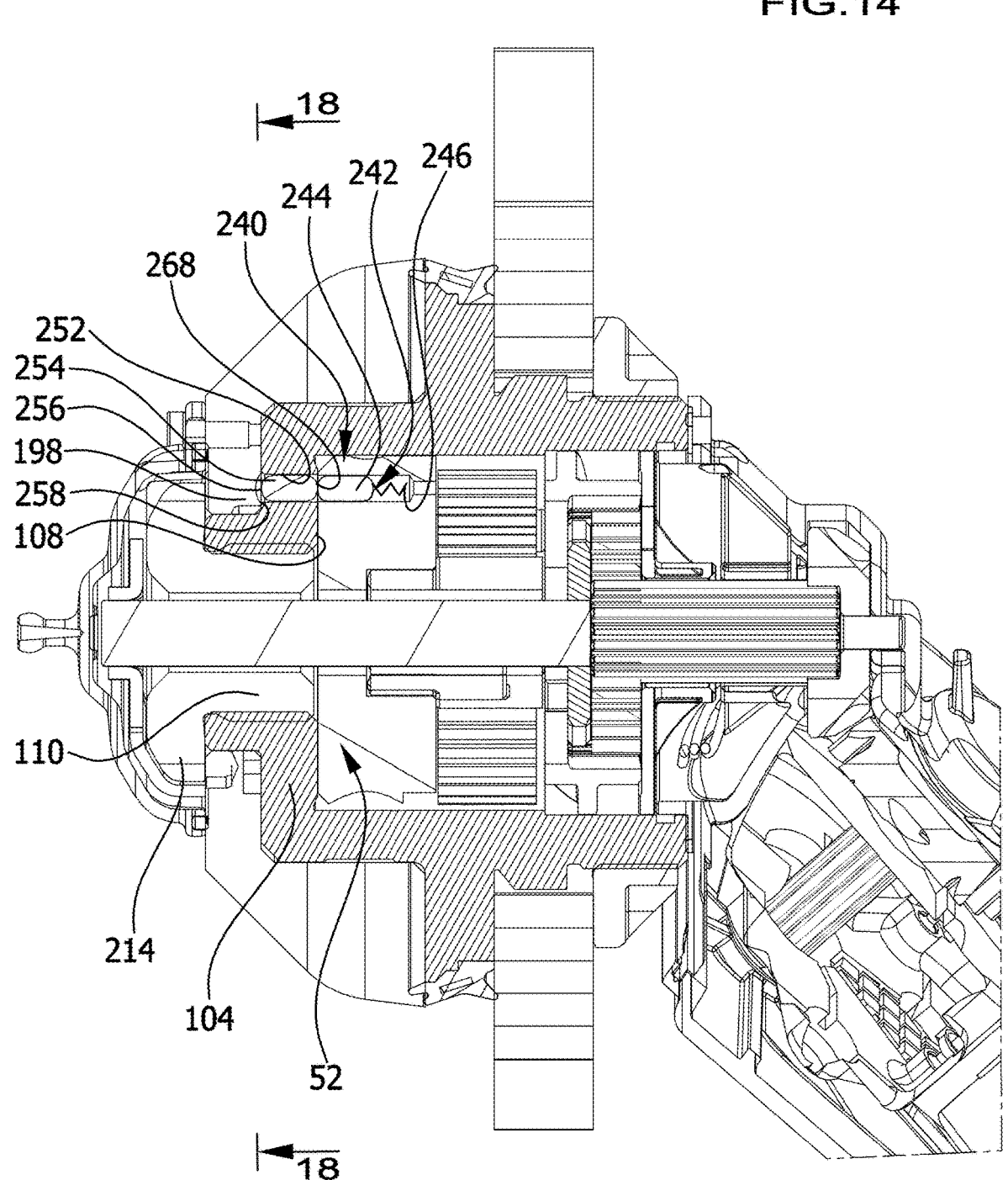
FIG. 14 shows a section along the line 14-14 in FIG. 18.
Figure 15:
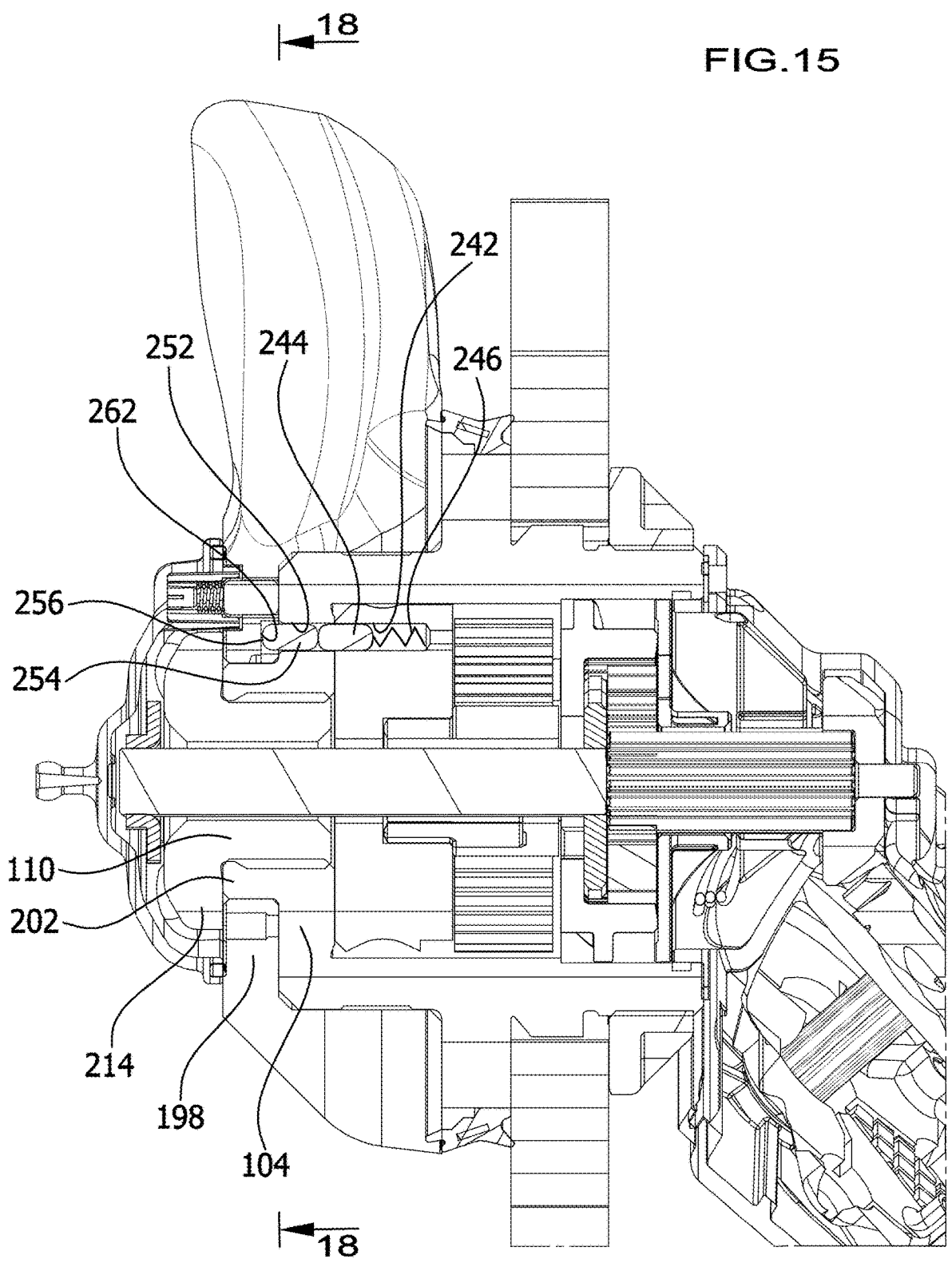
FIG. 15 shows a section along the line 15-15 in FIG. 17.
Figure 16:
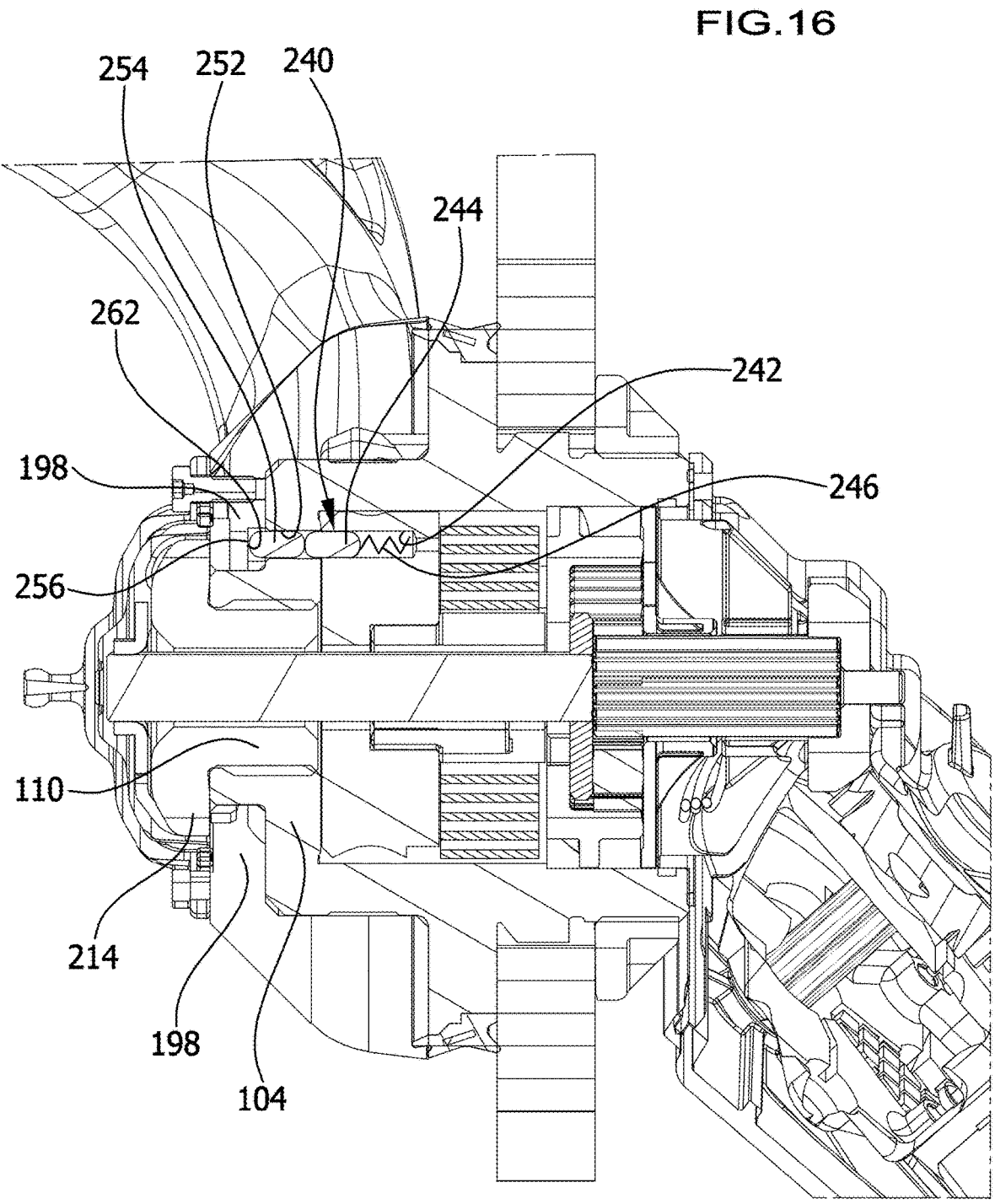
FIG. 16 shows a section similar to FIG. 15, further rotated in the direction of the rest position.

In order to fix the actuating body 52 in the releasing position, a releasing position locking device 240, shown in FIGS. 14 to 17, is provided which comprises, for example, a locking body 244 arranged in a bore 242 in the actuating body 52 and movable in a locking direction parallel to the bore 242, which locking body is urged by a spring unit 246 in the direction of a locking position and which can therefore transition from a locking releasing position, shown in FIG. 14, into the locking position, shown in FIGS. 15 and 16 and can engage in a locking receptacle 252 configured as a locking bore in the flange 104 when the actuating body 52 is in the releasing position shown, for example, in FIG. 8.

This means that the spring 246 urges the locking body 244 in the direction of the flange 104, wherein the locking body 244 develops no locking effect as long as it slides along outside the locking receptacle 252 when the actuating body 52 moves on the inner side 108 of the flange 104.

Only when the rotation of the actuating body 52 relative to the flange 104 is sufficiently advanced that the flange is in the releasing position can the locking body 244 engage in the locking receptacle 252 and thus fix the actuating body 52 in the releasing position so that, despite the effect of the torsional spring 114, the actuating body cannot move back (FIGS. 15, 16) into the rotation blocking position shown in FIG. 7.

In order to be able to move the locking body 244 out of its locking position engaging in the locking bore 252 again and into the locking releasing position and thus to deactivate the releasing position locking device 240, arranged in the locking receptacle 252 is a probe 254 which scans with a probe head 256 a flange side 258 of the end flange 198 facing toward the flange 104, wherein the flange side 258 has an activating surface 262 of an actuating guide 260, said activating surface being configured, for example, as a recess with which the probe head 256 of the probe 254 cooperates if it is to permit a locking of the locking body 244 with the locking bore 252.

Figure 17:
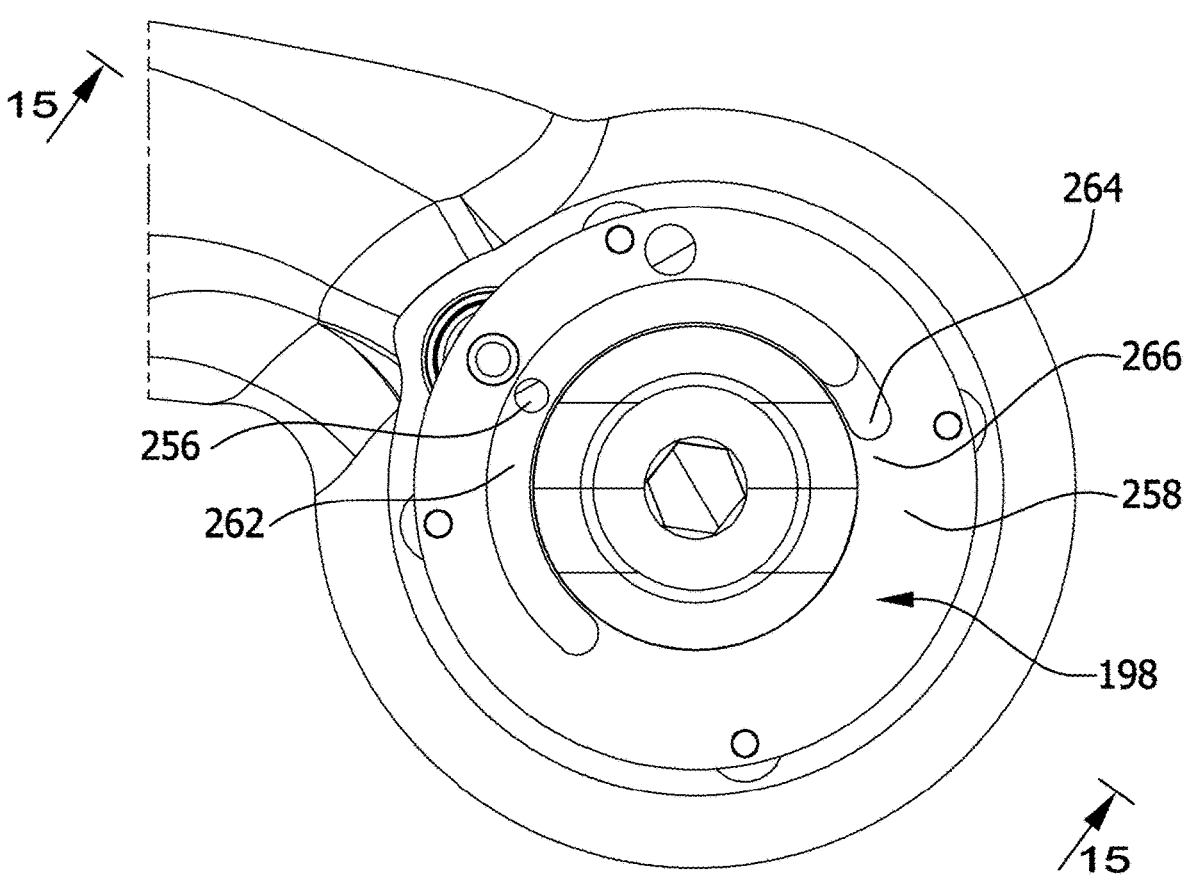
FIG. 17 shows a section along the line 17-17 in FIG. 15.

This position is shown, for example, in FIGS. 15, 16 and 17.

Figure 18:
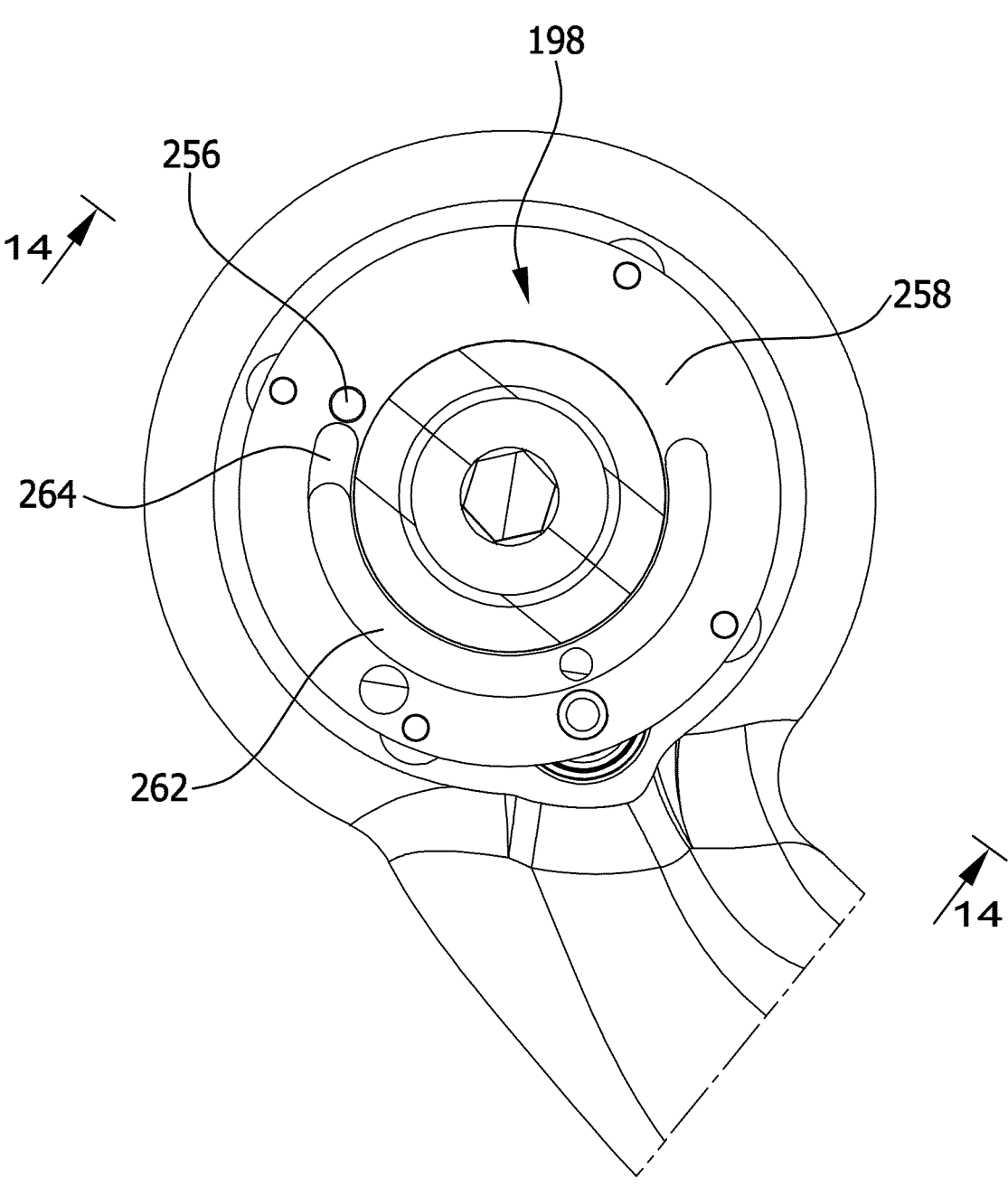
FIG. 18 shows a section along the line 18-18 in FIG. 14.

However, in order, for deactivating the releasing position locking device 240, to release the locking and to be able to move the locking body 244 from the locking position into the locking releasing position, specifically immediately before reaching the operating position or on reaching the operating position, as shown in FIGS. 17 and 18, the actuating guide 260 transitions with a ramp 264, for example, into a deactivating surface 266 that is raised relative to the activating surface 262, wherein on a rotation of the pivot bearing body 14 and thus also of the end flange 198 in the direction of the operating position A, the ramp 264 urges the probe head 256 of the probe 254, starting from the activating surface 262, increasingly in the direction of the locking body 244 and thus the probe 254 increasingly displaces the locking body 244 out of the locking receptacle 252 in the direction of the actuating body 52 so that when the probe head 256 has reached the locking releasing surface 266, as shown in FIGS. 14 and 18, the probe 254 is displaced so far in the direction of the actuating body 52 that its end surface 268 lying opposite the probe head 256 aligns with the inner side 108 of the flange 104.

Thus the releasing position locking device 240 of the actuating body 52 is deactivated by means of the locking body 244 on reaching the operating position A, so that then the actuating body 52 rotates, due to the force effect of the torsional spring 114, into the rotation blocking position and thus fixes the pivot bearing body 214 in this position non-rotatably relative to the guide body 40.

The position of the bore 242 guiding the locking body 244 and of the locking receptacle 252 and the position of the locking releasing surface 266 are selected so that immediately before reaching the operating position A, the probe head 256 of the probe 254 reaches the locking releasing surface 266 and therefore the probe 254 moves the locking body 244 out of the locking receptacle 252 and thereby releases the locking of the actuating body 52 in the locking releasing position immediately before reaching, or at the latest on reaching, the operating position, so that then in the operating position A also, the rotation blocking bodies 54 engage in the receptacles 60 which in this position are arranged aligned with the guiding receptacles 56 and can fix the pivot bearing body 14 non-rotatably relative to the guide body 40.

With the solution described above, only one set of receptacles 60 for the non-rotatable fixing of the pivot bearing body 14 in the operating position A is provided, whereas in the rest position R, a fixing of the pivot bearing body 14 by the rotation blocking device 50 is not provided.

Figure 12:
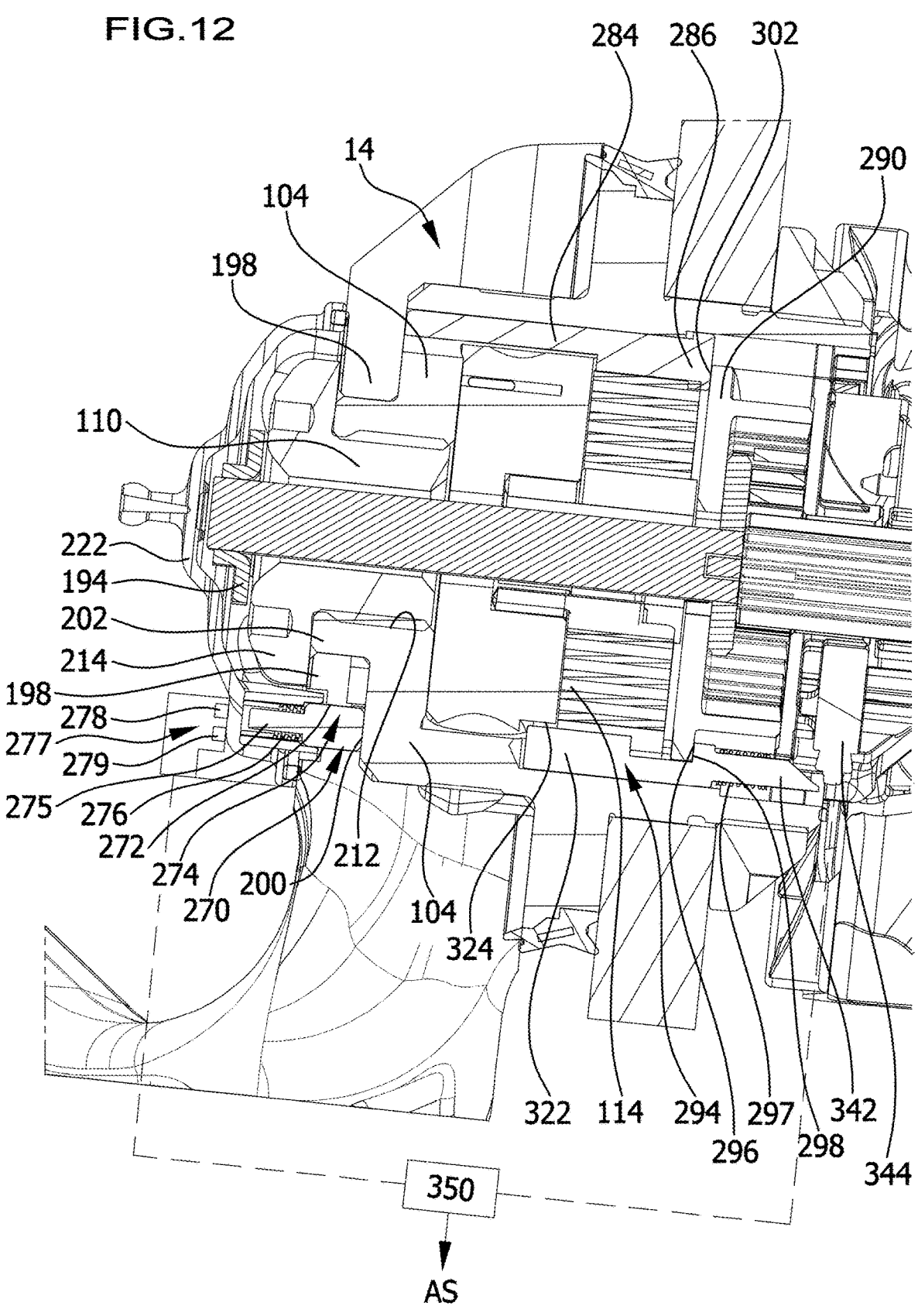
FIG. 12 shows an enlarged section according to FIG. 6 in the operating position.
Figure 13:
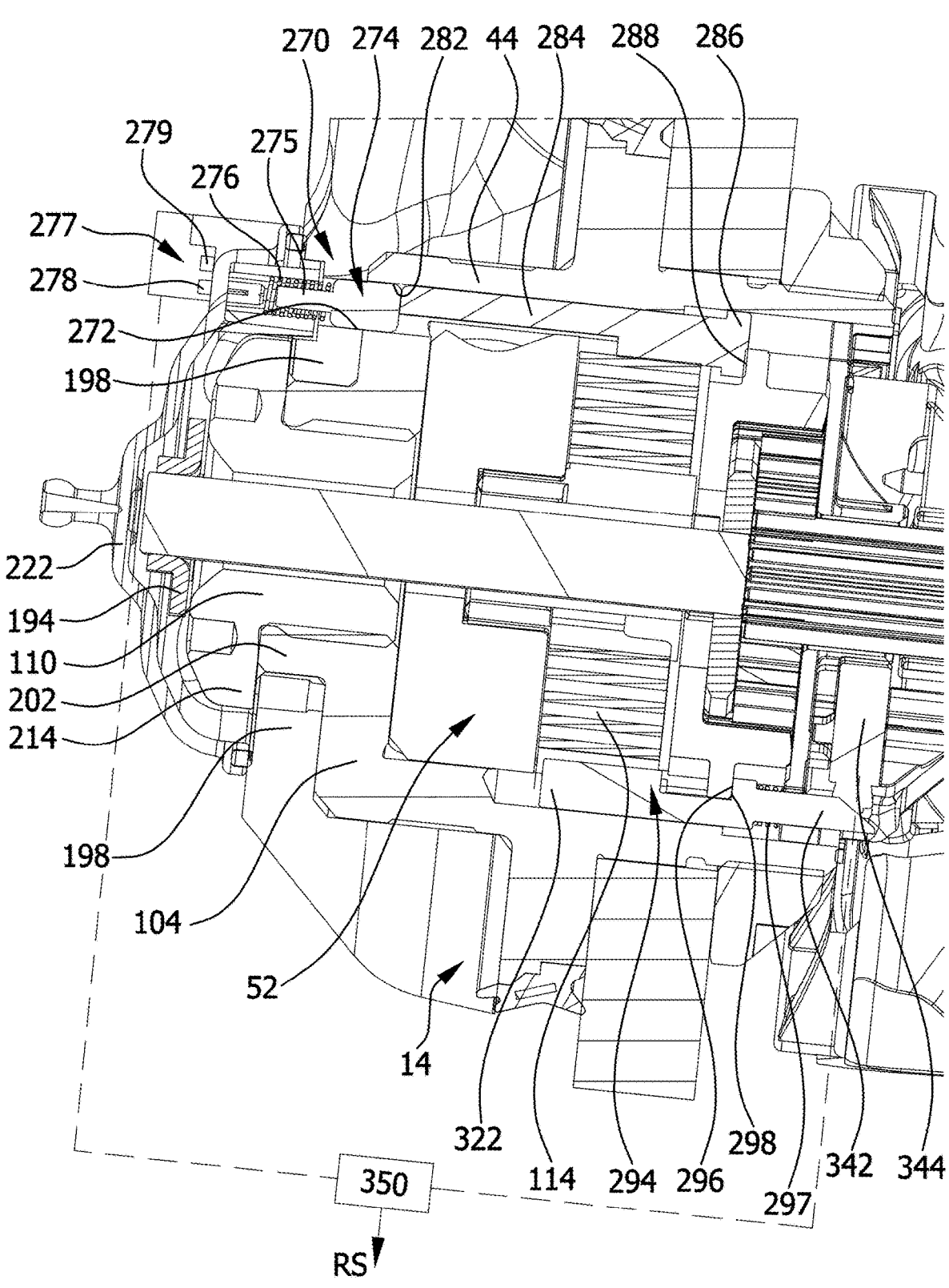
FIG. 13 shows an enlarged section similar to FIG. 12 in the rest position.

Rather, for fixing the pivot bearing body 14 in the rest position as shown in FIGS. 12 and 13, a rest position locking device 270 is provided which has a locking body 274 provided in the end flange 198 of the pivot bearing body 14 in a bore 272, said locking body having force applied to it by a spring element 276 arranged, for example, in the bore 272 and surrounding a projection 275 of the locking body 274, in the direction of a locking direction parallel to the bore 272 and in the direction of the flange 104.

In particular, the locking body 274 abuts the outer region 200 of the flange 104 in all rotation positions of the pivot bearing body 214 except for the rest position R, which holds the locking body 274 in its inactive position in all positions of the pivot bearing body 14.

The locking body 274 preferably engages in a locking receptacle 282 constructed as a locking bore in the flange 104 only when the pivot bearing body 14 is in the rest position (FIG. 13) so that then the locking body 274 is located in its active position.

The spring element 276 constantly urges the locking body 274 in the direction of the flange side of the flange 104 facing the end flange 198 and therefore constantly holds it in a locking readiness position wherein an engagement of the locking body 274 in the locking receptacle 282 and thus a transition from the inactive position into the active position is only possible when the pivot bearing body 14 has reached the rotation position relative to the guide body 40 of the pivot bearing unit 20 corresponding to the rest position R.

In order to detect the respective position of the locking body 274, i.e. the inactive position, as shown in FIG. 12, and the active position, as shown in FIG. 13, a detector unit 277 is arranged on the covering 222 which detects the positions of the locking body 274 by means of a magnetic field sensor 278.

Preferably, the magnetic field sensor 278 is arranged on a side of the covering 222 opposite to the bore 272 and reacts to changes in a magnetic field of a magnet, in particular a permanent magnet, 279 arranged stationary in the detector unit 277 and close to the magnetic field sensor 278, said field penetrating the covering 222, said changes taking place by means of the magnetizable locking body 274 and, in particular, also its magnetizable projection 275, when they move from the inactive position into the active position and vice versa.

Since the detector unit 277 is arranged and held on the covering 222, the detector unit is also pivoted—in the same way as the cover 222—on pivoting of the pivot bearing body 14 from the operating position into the rest position and vice versa.

For deactivating the rest position locking device 270, that is, for overriding the locking position of the locking body 274, in continuation of the locking receptacle 282 in the guide sleeve 44, an actuating pin 284 is provided which scans, with a probe head 286, a guide track 288 provided on the ring gear 142, said guide track being arranged on a guide flange 290 extending circumferentially on the ring gear 142 radially externally to the internal toothing 144 and therefore forms a deactivating unit 280.

In addition, the guide flange 290 of the ring gear 142 carries not only the guide track 288 for actuating the actuating pin 284, but also a securing guide track 298 for actuating a securing pin 294 which scans the securing guide track 298 by means of a scanning surface 296 and is therein urged by a spring 297 in the direction of a rotation blocking position, as shown in FIGS. 12 and 13.

For this purpose, the securing pin 294 has a securing body 322 which engages, for securing the rotation position of the actuating body 52 in the rotation blocking position, in a securing recess 324 in the actuating body 52 which is configured such that the actuating body 52 is not able to leave the rotation blocking position and thus the rotation blocking position is secured in the operating position, which thus means that the locking of the pivot bearing body 214 in the operating position is secured.

The securing pin 294 which is movable by means of the securing guide track 298 forms, together with the securing body 322 and the securing recess 324, a securing device 330.

The securing guide track 298 is preferably arranged, as shown in FIGS. 19 to 25, opposite the guide track 288 on the guide flange 290 and formed such that it already displaces the securing pin 294 starting from its securing position in which the securing body 322 engages in the securing recess 324, after the initial rotation of the ring gear 142, beginning from the starting position in the rotation direction 292, so far that the securing body 322 emerges from the securing recess 324 of the actuating body 52 in order to free up the subsequent rotation movement of the actuating body 52.

For this purpose, the securing guide track 298 is provided with a securing region 332 permitting a securing of the rotation blocking position of the actuating body 52 and an unsecuring region 334 causing an unsecuring of the movement of the rotation blocking body 52, which are connected to one another by way of a transition region 336.

Furthermore, the securing pin 294 is also provided with a projection 342 which, depending on the position of the securing pin 294, actuates or does not actuate a detector 344, wherein for example the detector 344 constructed as a switch device is arranged such that it is not actuated in the position of the securing pin 294 securing the rotation blocking position and, in the unsecured position, that is, the position freeing a movement of the actuating body 52 out of the rotation blocking position, is actuatable, as shown in FIGS. 12 and 13.

Both the detector unit 277 and the detector 344 are connected to a state evaluating unit 350, for example by way of lines, not shown in FIGS. 12 and 13, which unambiguously indicates the locking in the rest position R and the securing of the rotation blocking position in the operating position A for safety systems of a vehicle.

If the detector unit 277 detects the locking body 274 in its active position, according to FIG. 13, in which it engages in the locking receptacle 282, then a signal RS is output by the state evaluating unit 350 only if the detector 344 simultaneously indicates that the securing pin 294 is located in the position freeing the rotation blocking position, i.e. the detector 344 is actuated (FIG. 12).

If the detector 344 is not actuated by the securing pin 294 and therefore thereby the rotation blocking position is secured by the securing pin 294, then the state evaluating unit 350 outputs a signal AS which unambiguously indicates the secured rotation blocking position in the operating position A only if the locking body 274 is in its inactive position sliding on the region 200 of the flange 104 and this is simultaneously detected by the detector unit 277 (FIG. 13).

Thus, with the solution according to the invention, by means of the state evaluating unit 350, an unambiguous indication of the secured blocking of the pivot bearing unit 14 is possible both in the rest position R and also in the operating position A.

FIGS. 19 to 25 show the cooperation of the rotation movement of the ring gear 142 starting from a rest position existing in the operating position on rotation in a rotation direction 292 with the drive sleeve 122 for driving the actuating body 52 by means of the drive slots 156a and 156b, which are arranged in the flange body 154 of the ring gear 142, with the drive fingers 158a, 158b engaging in these drive slots 156a, 156b and with the probe head 286 of the actuating pin 284 of the deactivating unit 280 and a securing pin 294 of the securing device 330, which cooperates with a guide track 298 also formed by the guide flange 290 and scans this guide track 298 by means of the scanning surface 296, as described in detail below.

Figures 19A, 19B, 19C:
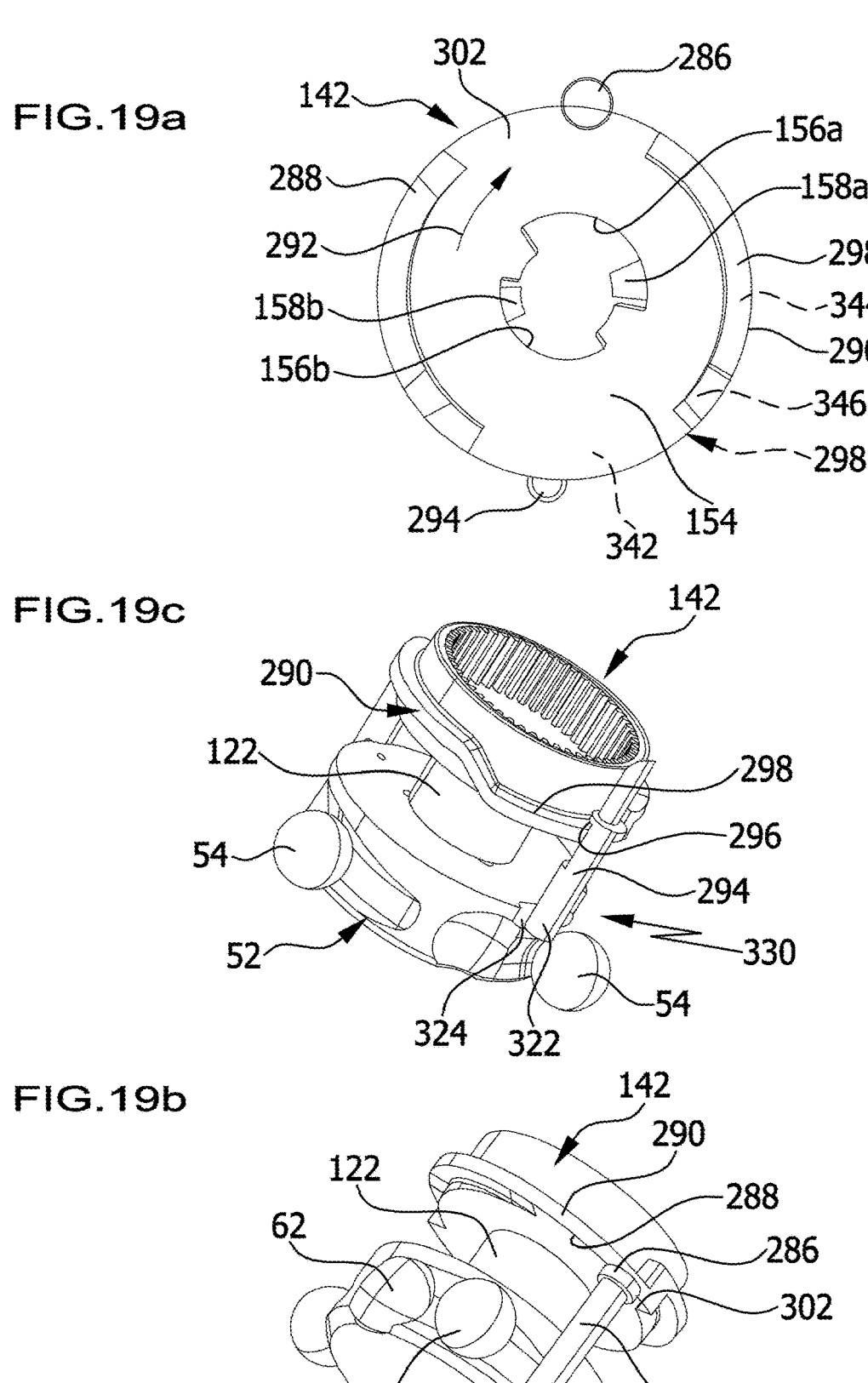

In the starting position shown in FIG. 19a-c, the probe head 286 lies on a path portion 302 of the guide track 288, whereby the actuating pin 284, as shown in FIG. 12, is in a position in which it would cause a releasing of the locking body 274 of the rest position locking device 270 if the pivot bearing body 14 were to be in the rest position. Since however, according to FIG. 19a-c, the pivot bearing body 14 is in the operating position, the actuating pin 284 has no effect.

Furthermore, the securing pin 294 guided by the securing guide track 298 is in its securing position in which it secures the rotation blocking position of the actuating body 52.

If a driving of the ring gear 142 by means of the planetary gearset 130 now takes place, the ring gear 142 rotates in the rotation direction 292 and the probe head 286 moves to a region 304 of the guide track 288 which is set back relative to the region 302 in a direction parallel to the pivot axis, so that it permits a movement of the actuating pin 284 provided said actuating pin is acted upon by the locking body 274, although this is not the case, so that the actuating pin 284 can also remain in the position that was predetermined by the region 302 of the guide track 288.

Figure 20A:
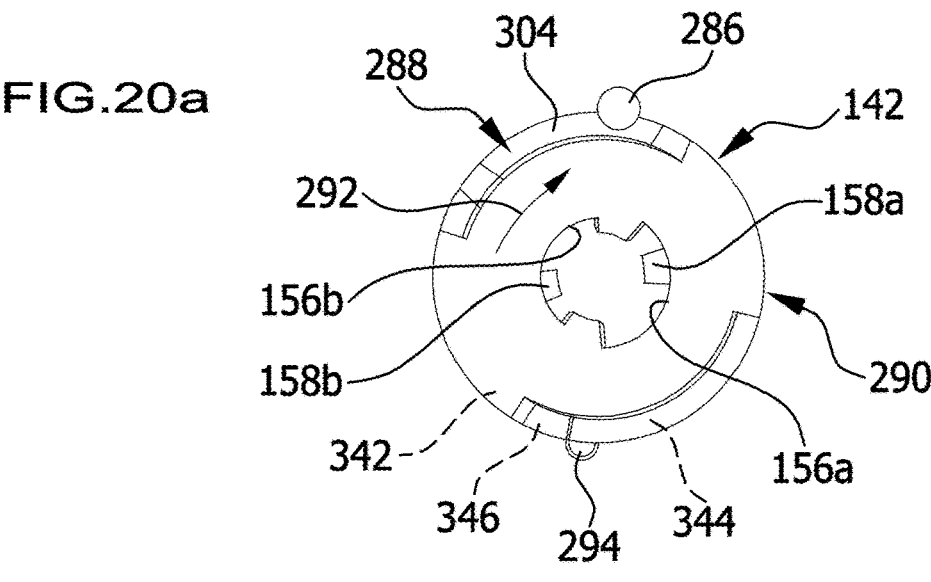

As also shown in FIG. 20a, the rotation of the ring gear 142 with the guide flange 290 takes place without a driving of the drive sleeve 122 taking place, since the drive slots 156a, 156b permit such a relative rotation of the ring gear relative to the drive fingers 158a, 158b without co-rotating them.

Figure 20C:
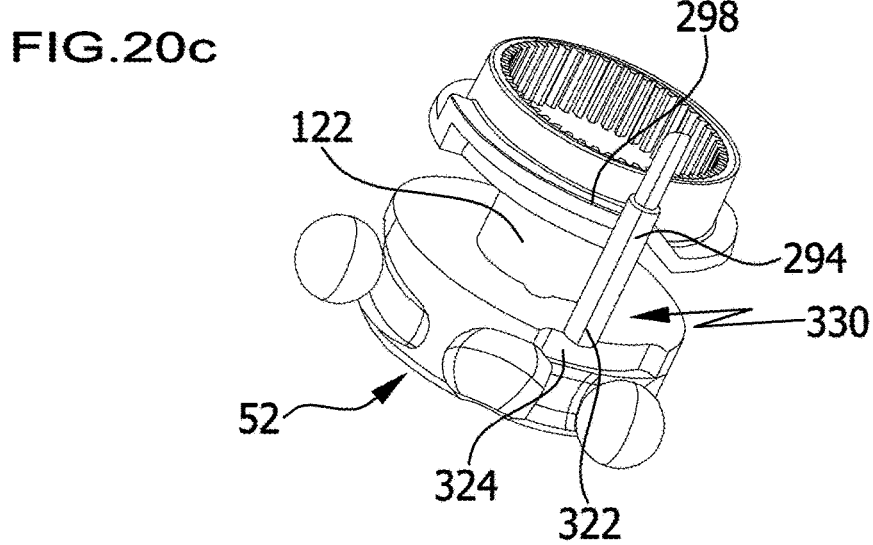
Figure 20B:
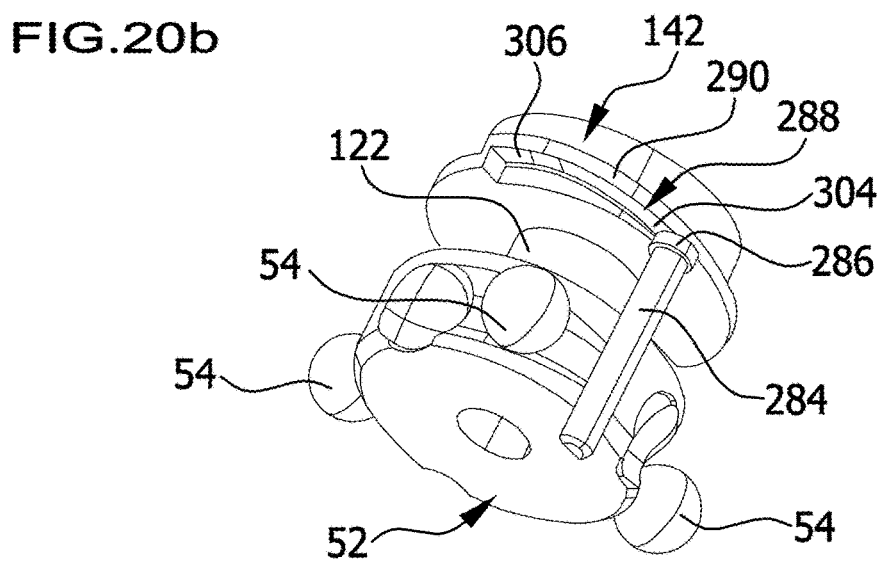

In addition, the rotation of the ring gear 142 causes the securing guide track 298 to influence the securing pin 294 such that said pin is moved starting from the securing position into the unsecuring position and thereby the securing body 322 emerges from the securing recess 324 of the actuating body 52 in order to allow a rotation movement of the actuating body 52 (FIG. 20*b*).

This unsecuring position is maintained by the securing guide track 298 for as long as the pivot bearing body 14 is again in the operating position.

Figure 22A:
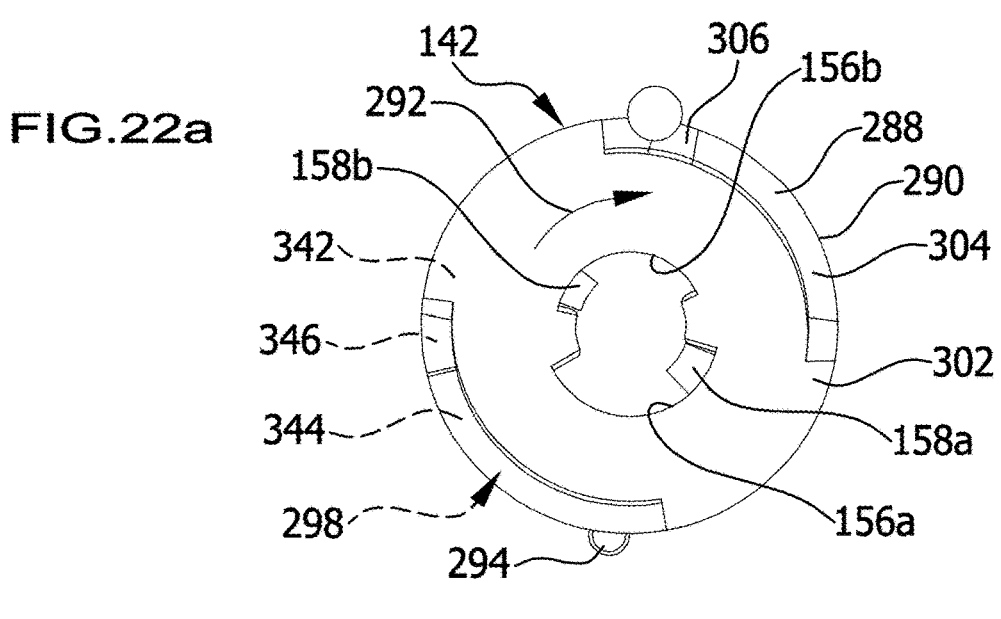
Figure 22C:
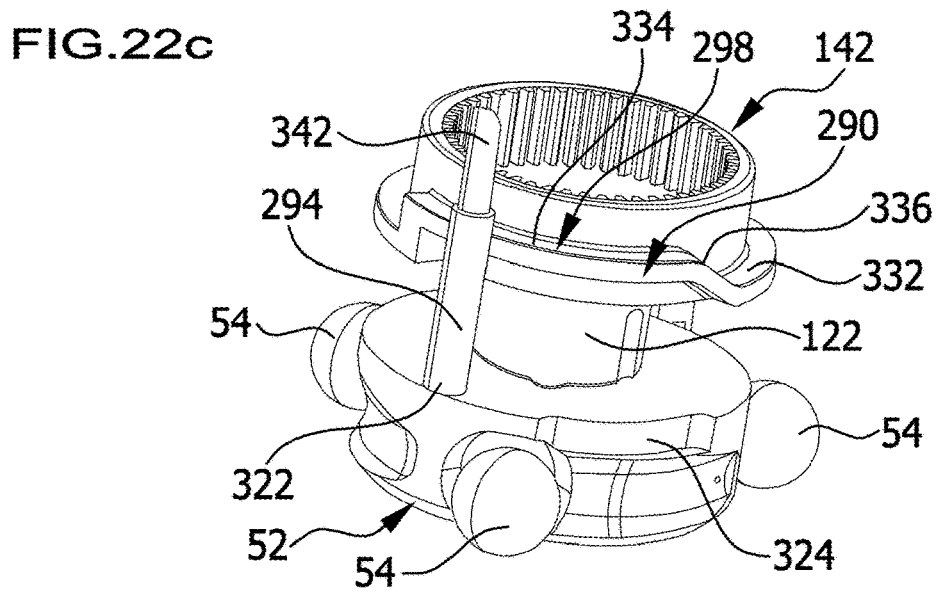
Figure 22B:
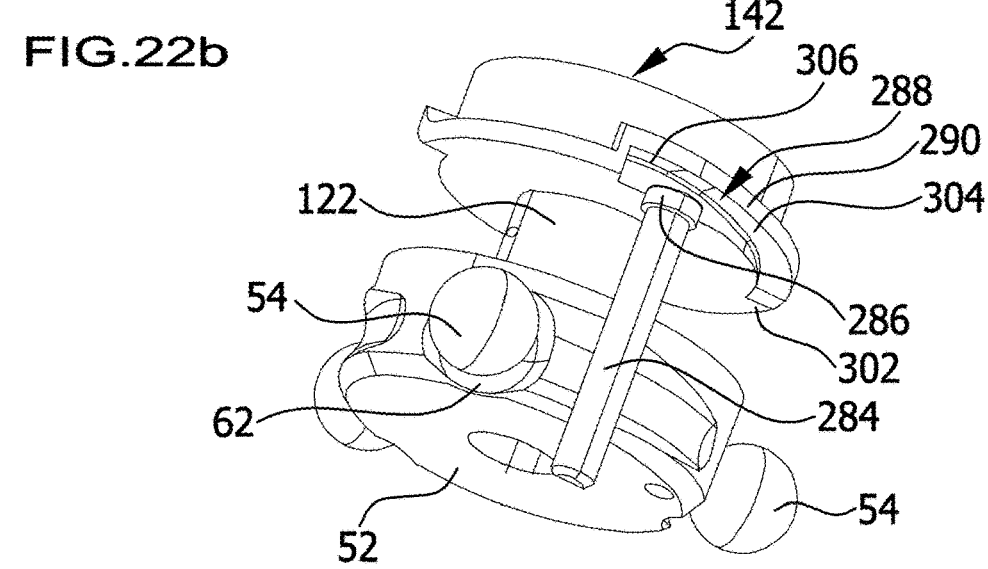

The ring gear 142 can therein be rotated further until the drive slots 156*a*, 156*b* abut the drive fingers 158*a*, 158*b* in the rotation direction 292, wherein the probe head 286 of the actuating pin 284 moves further relative to the guide track 288 by way of the region 304 thereof and the region 304 extends increasingly set back in relation to the region 302. The driving of the drive sleeve 122 by co-driving the drive fingers 158*a*, 158*b* about the pivot axis now has the result that additionally, a rotation of the actuating body 52 also takes place, specifically, as shown in FIG. 22*a-c*, until the rotation blocking bodies 54 can enter into the retraction receptacles 62 associated with them and thus reach the releasing position in which they lie in the retraction receptacles 62 so that now the rotation blocking device 50 is in its releasing position and frees a rotation movement of the pivot bearing body 14 so that it can pivot out of the operating position.

As soon as the actuating body 52 has reached the releasing position of the rotation blocking device 50, a fixing of the actuating body 52 in its releasing position takes place by means of the releasing position locking device 240 in the manner described.

Figure 23A:
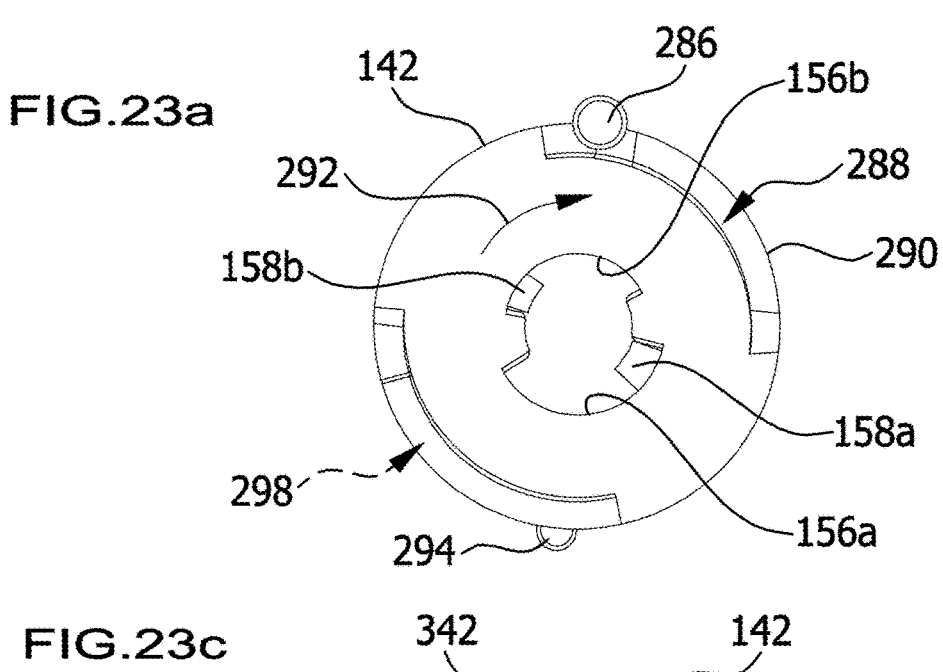
Figure 23C:
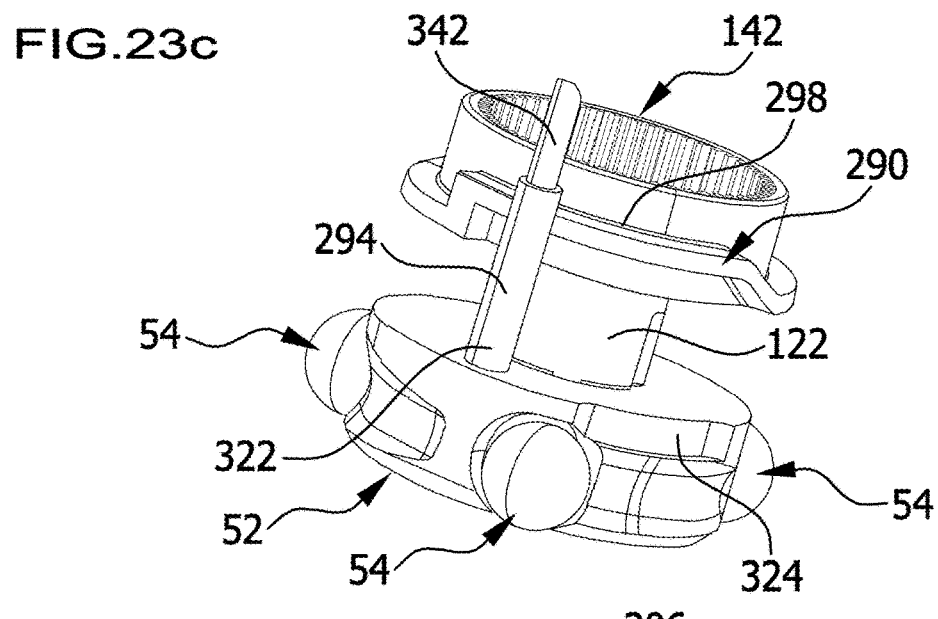
Figure 23B:
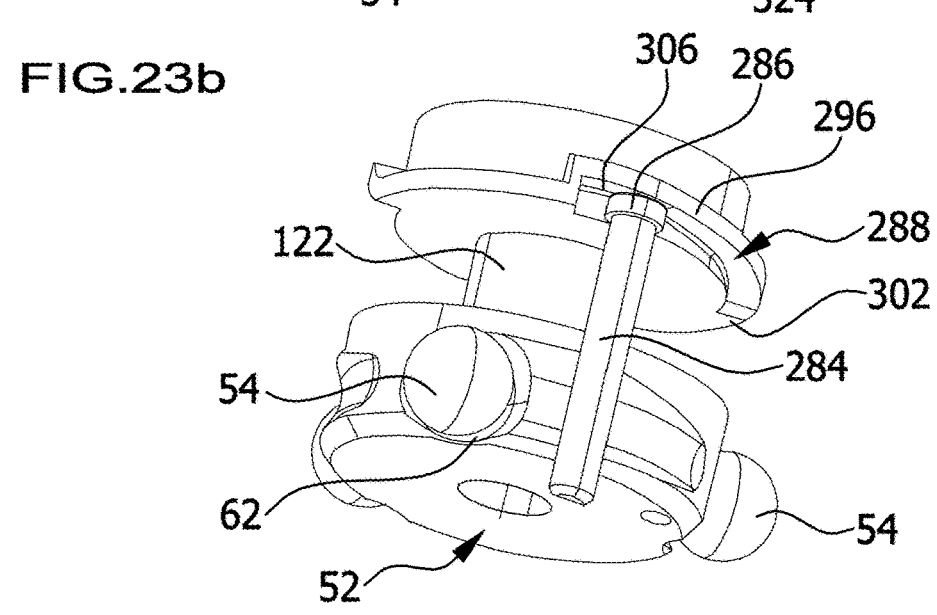

By means of this fixing of the actuating body 52 in the releasing position by means of the releasing position locking device 240, the rotation position of the drive sleeve 122 and thus also of the drive fingers 158*a* and 158*b* thereof is fixed in the rotation position corresponding to the releasing position of the actuating body 52, which corresponds also, according to FIG. 23*a-c*, to the rotation position of the ring gear 142.

In this rotation position of the ring gear 142, the actuating pin 284 has the possibility to move far enough so that the locking body 274 of the rest position locking device 270 can enter the locking receptacle 282 and fix the pivot bearing body 14 in the rest position. However, this only takes place when, as shown in FIG. 13, the pivot bearing body 214 has reached the rest position.

This position is shown in FIG. 23*a-c* and is reached by further rotation of the ring gear 142 starting from the position according to FIG. 22*a-c* in the rotation direction 292.

In this position, the actuating pin 284 is acted upon by the locking body 274 so that the probe head 286 is moved until it abuts the region 306 of the guide track 288, wherein thereby the actuating pin 284 permits the engagement of the locking body 274 in the locking receptacle 282.

After the rest position of the pivot bearing body 14 is reached, a switching off of the drive for the planetary gearset 130 also takes place so that the ring gear 142 remains in the position shown in FIG. 23*a-c* and thus the actuating pin 284 also maintains the rest position of the pivot bearing body 214 by placing the probe head 286 on the region 306 of the guide track 288, in that the locking body 274 remains in the locking receptacle by means of the influence of the spring element 276 without the actuating pin 284 acting thereagainst.

Figures 24A, 24B, 24C:
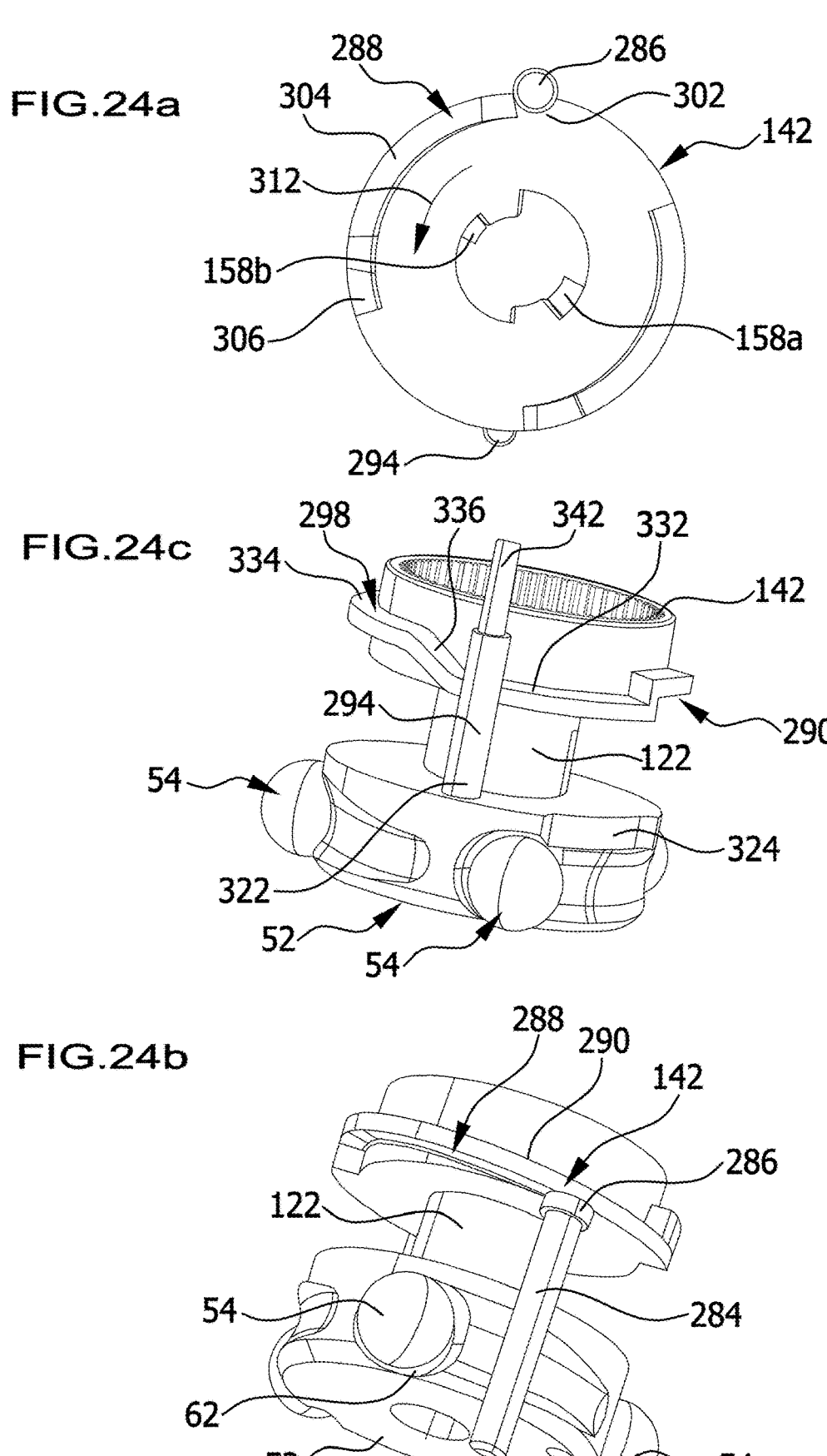
FIGS. 24a, 24b, and 24c show views in a position of the ring gear rotated relative to the starting position and deactivation of the rest position locking device, with FIG. 24a showing a plan view of the ring gear of the planetary gearset from the side of the drive sleeve, FIG. 24b showing a perspective representation of the cooperation of the ring gear in the position according to FIG. 24a with the deactivating unit for the rest position locking device and with the rotation blocking device, and FIG. 24c showing a perspective representation of the cooperation of the ring gear in the position according to FIG. 24a with a securing device and with the rotation blocking device.

If now, a transition of the pivot bearing body 214 from the rest position into the operating position is to take place, then a driving of the planetary gearset 130 takes place, although now in the reverse direction so that the ring gear 142 also rotates in the reverse rotation direction, in this case in the rotation direction 312 (FIG. 24*a-c*).

In this way, the guide track 288 moves relative to the probe head 286 of the actuating pin 284 along the guide track 288 into the region 302, which has the result that by means of the region 304 rising starting from the region 306, a displacement of the actuating pin 284 in the direction of the end flange 198 and thus a pushing out of the locking body 274 out of the locking receptacle 282 takes place, so that thereby the rest position locking device 270 transitions into its released position and thus the locking of the pivot bearing body 214 in the rest position no longer exists.

Therein however, as before, the actuating body 52 of the rotation blocking device 50 is fixed in its releasing position by means of the releasing position locking device 240, wherein a releasing of the blocking of the rotation blocking body 52 in the releasing position takes place dependent upon the rotation position of the pivot bearing body 14, which depends upon the relative rotation of the actuating guide 262 relative to the probe 254 with the probe head 256 arranged non-rotatably in the flange 104, as FIG. 18 shows.

For example, the actuating guide 262 is constructed so that, by means of the probe 254 in a rotation position lying between the rest position and before reaching the operating position, it has a releasing effect, preferably in a small angular region lying before the operating position.

Figures 25A, 25B, 25C:
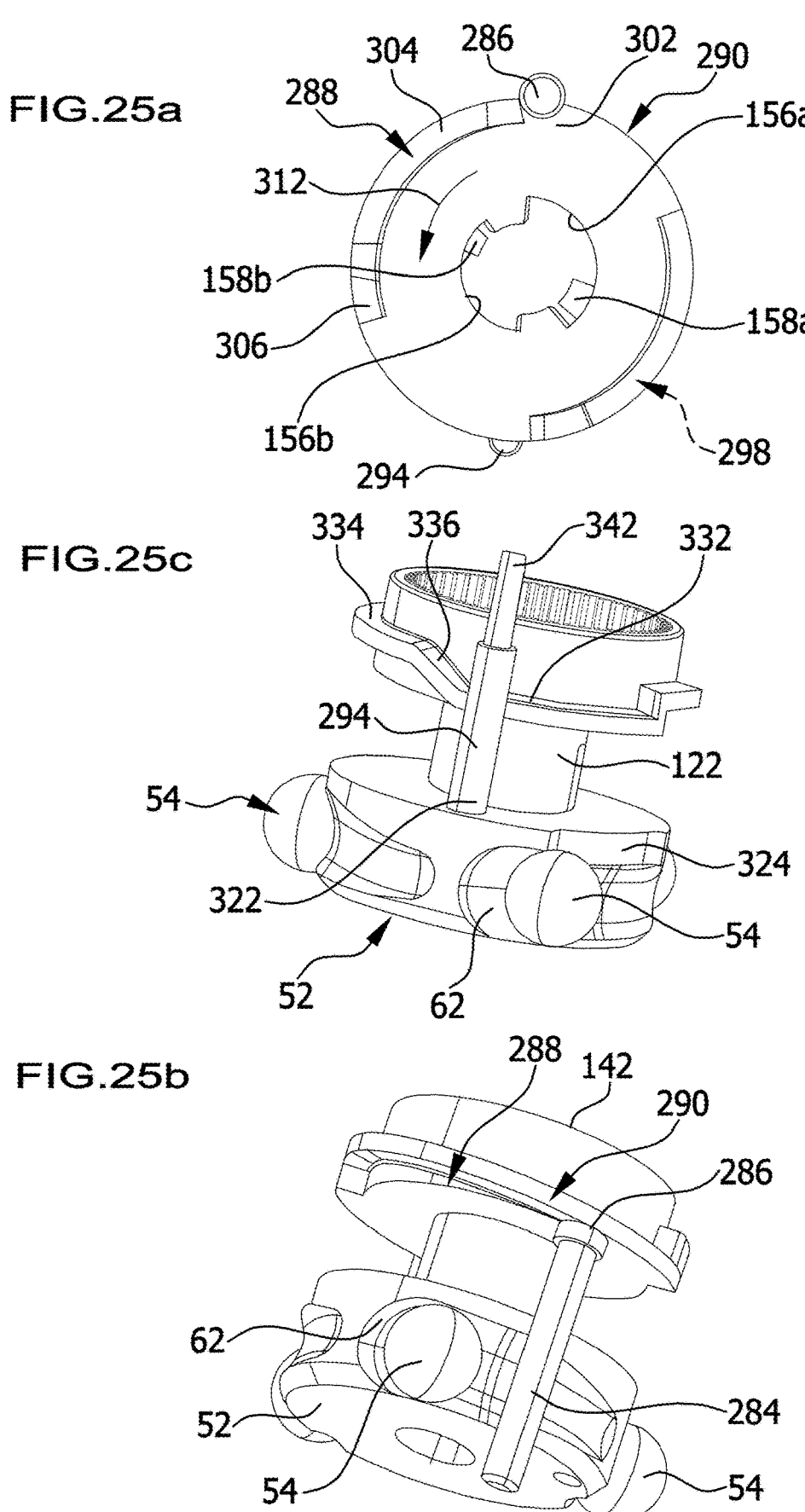
FIGS. 25a, 25b, and 25c, show views in a position of the ring gear rotated relative to the starting position on a transition of the rotation blocking device into the rotation blocking position; with FIG. 25a showing a plan view of the ring gear of the planetary gearset from the side of the drive sleeve, FIG. 25b showing a perspective representation of the cooperation of the ring gear in the position according to FIG. 25a with the deactivating unit for the rest position locking device and with the rotation blocking device, FIG. 25c showing a perspective representation of the cooperation of the ring gear in the position according to FIG. 25a with a securing device and with the rotation blocking device.

After the releasing of the releasing position locking device 240, a rotation movement of the actuating body 52 takes place through the influence of the torsional spring 114, so that the actuating body 52 also begins to rotate with the drive sleeve 122 in the rotation direction 312 and rotates relative to the ring gear 142 due to the mobility of the drive fingers 158 relative to the drive slots 156, as shown in FIG. 25*a-c*, so that the drive fingers 158*a*, 158*b* begin to move relative to the drive slots 156*a*, 156*b* in the rotation direction 312, in order then, in the operating position, to reach the rotation position shown in FIG. 19*a-c*.

The trailer coupling according to the invention now operates as follows.

Starting from the operating position shown in FIGS. 1, 2, 3 and 6, and also 7, in which the pivot bearing body 14 is rotationally blocked relative to the guide body 40 in relation to a rotation movement about the pivot axis 22 by the rotation blocking device, specifically in that the actuating body 52 has moved the rotation blocking bodies 54 radially outwardly in the guiding direction 58 so far from the pivot axis 22 that they engage in the receptacles 60 and thereby fix the pivot bearing body 14 rotationally blocked relative to the guide body 40, a switching on of the drive unit causes the drive gearwheel 174 to be driven with the output gear such that the drive shaft 166 drives the sun gear 162.

This, in turn, drives the planet gears 146, wherein in that the pivot bearing body 14 is blocked with regard to a rotation movement about the pivot axis 22 by the rotation blocking device 50, the planet gear carrier 152 is also blocked so that the drive arms 196 of the drive body 194 cannot pivot relative to the supporting bodies 226 and 228, and consequently a rotation movement of the guide shaft 100, to which the planet gear carrier 152 is non-rotatably connected, also cannot take place.

Figures 21A, 21B, 21C:
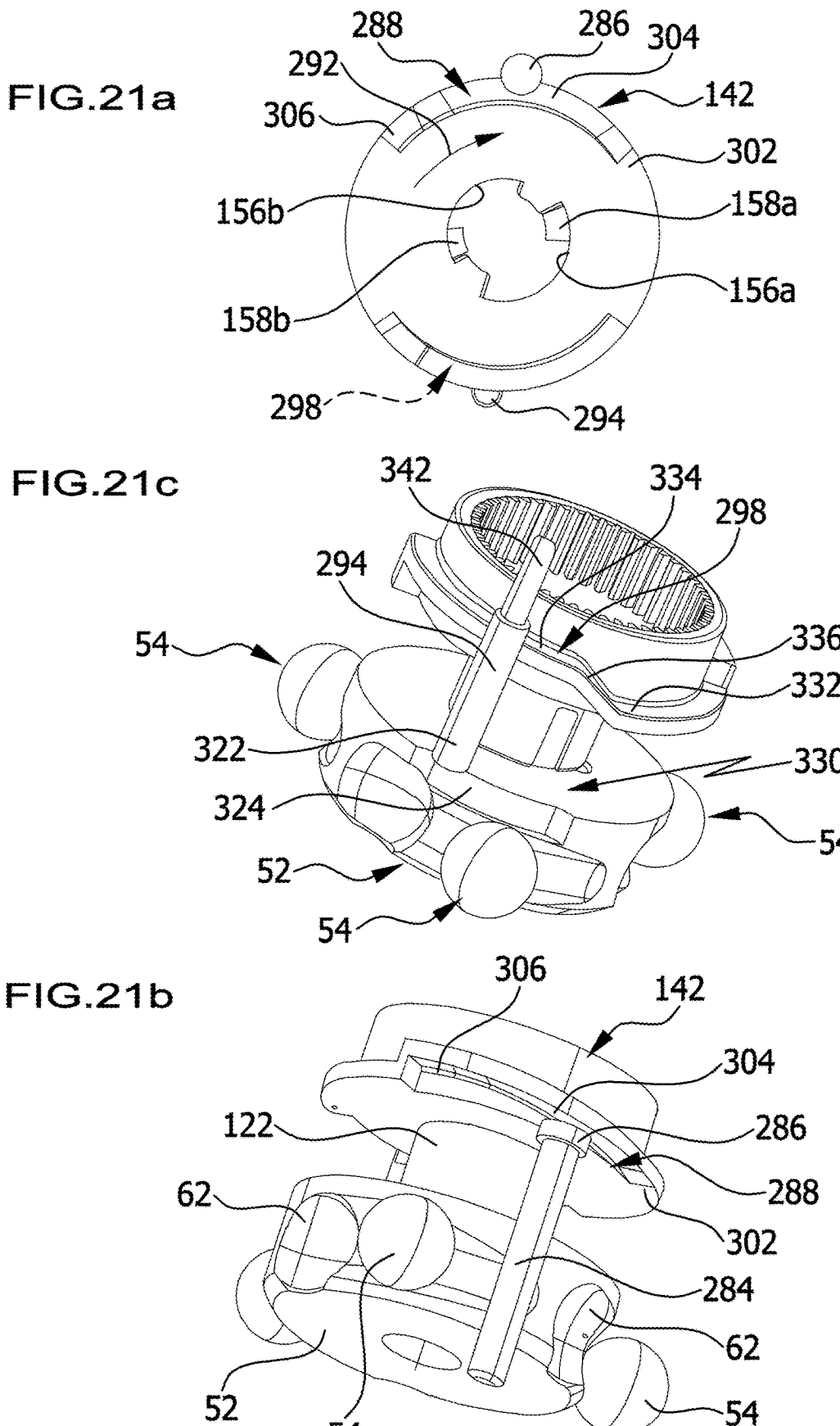

As a result, a driving of the ring gear 142 takes place such that it rotates according to FIG. 19*a-c*, in the rotation direction 292. This rotation of the ring gear 142 initially causes an actuation of the securing device 320, wherein by displacement of the securing pin 294, the securing body 322 leaves the securing recess 324 of the actuating body 52 and transitions from the securing position into the unsecuring position (FIG. 20*a-c*). A further rotation of the ring gear has the result that the guide track 288 no longer acts upon the probe head 286 and thus permits a movement thereof in the direction away from the flange 104, as FIGS. 20 and 21 show, so that the rest position locking device 270 is activated without a rotation of the actuating body 52 of the rotation blocking device 50 already occurring.

Subsequently, as FIGS. 22 to 23 show, by way of the drive slots 156 and the drive fingers 158, there takes place a pivoting of the drive sleeve 122 which is non-rotatably connected by way of the projections 124 to the actuating body 52.

In this way, by means of the ring gear 142, the actuating body 52 is pivoted out of the rotation blocking position in the direction of its releasing position, specifically far enough until the releasing position is reached and the releasing position locking device 240 of the actuating body 52 becomes operative and locks it in the releasing position relative to the guide body 40 in the manner described, as illustrated in FIGS. 15 and 16.

Since, on reaching the releasing position, a rotation movement of the pivot bearing body 14 is now possible and also the rotation movement of the actuating body 52 contrary to the rotation direction 72 is blocked by means of the releasing position locking device 240, the ring gear 142 of the planetary gearset 130 remains static, while the planet gear carrier 146 now rotates, which by way of the pivot drive shaft 100 and the drive body 194 with the drive arms 196 is able to pivot the pivot bearing body 14 about the pivot axis 22 in the direction of the rest position R.

On reaching the rest position R, the rest position locking device 270 becomes active, specifically in that the locking body 274 is able to engage in the locking bore 282 and to displace the probe 254 with the actuating pin 294 in the direction of the guide track 288.

Thereby, a locking of the pivot bearing body 14 in the rotation position corresponding to the rest position R of the ball neck 10 by means of the rest position locking device 270 takes place.

In this rest position, a switching off of the drive unit takes place.

If a pivoting of the ball neck 10 back from the rest position R into the operating position A is now to take place, then the drive unit is operated with the reverse rotation direction.

Since a pivoting of the pivot bearing body 214 is not possible due to the active rest position locking device 270, the planetary gearset 130 drives the ring gear 142 in the rotation direction 312, which, as FIG. 24*a-c* shows, acts upon the actuating pin 294 with the guide track 288, so that said actuating pin deactivates the rest position locking device 270.

Since a rotation of the actuating body 52 is not possible due to the operative releasing position locking device, the planetary gearset 130 causes a rotation movement of the planet gear carrier 152, which drives the drive body 194 with the drive arms 196 by way of the pivot drive shaft 100 and a pivoting of the pivot bearing body 14 with pivoting of the ball neck 10 in the direction of the operating position A takes place.

Immediately before reaching the operating position A, as shown, for example, in FIG. 18, a deactivation of the releasing position locking device 240 takes place, in the manner described, i.e. a transition thereof from the locking position into the locking releasing position and thus the release of the actuating body 52 for movement in the rotation direction 72 under the influence of the torsional spring 114 in the direction of the rotation blocking position, wherein the rotation blocking bodies 54 are pressed outwardly radially to the pivot axis 22 into the receptacles 60 by means of the actuating body 52 and therefore again lead to a rotation blocking of the pivot bearing body 14 relative to the guide body 40.

In this locked position of the pivot bearing body 14 relative to the guide body 40, a rotation movement of the planet gear carrier 152 is again blocked 152, so that the ring gear 142 is rotated further, specifically into the starting position shown in FIG. 19*a-c*, in which the actuating body 52 can carry out a further rotation movement in the rotation direction 72 under the action of the torsional spring 114, so that in the operating position A, the ring gear 142 does not hinder a readjustment by further rotation of the actuating body 52 in the rotation direction 72 under the influence of the torsional spring 114.

The invention claimed is:

1. A trailer coupling comprising a ball neck which is movable between an operating position and a rest position with a pivot bearing body arranged on a first end and a coupling ball arranged on a second end, a pivot bearing unit fixedly arranged on a vehicle, by which pivot bearing unit the pivot bearing body is accommodated to be pivotable about a pivot axis between the operating position and the rest position, a rotation blocking device which, in the operating position, in a rotation blocking position, blocks a pivot movement of the pivot bearing body about the pivot axis and, in a releasing position, frees the pivot movement of the pivot bearing body, and a rest position locking device which, in an inactive position, permits a movement of the pivot bearing body relative to the pivot bearing unit and, in a locking position, non-rotatably fixes the pivot bearing body relative to the pivot bearing unit in the rest position, wherein associated with the rest position locking device is a detector unit which detects at least one active position of the rest position locking device, and wherein the detector unit contactlessly detects the at least one position of the rest position locking device.

2. The trailer coupling according to claim 1, wherein the detector unit also detects an inactive position of the rest position locking device.

3. The trailer coupling according to claim 1, wherein the detector unit generates a signal indicative of the position of the rest position locking device without contacting the rest position locking device.

4. The trailer coupling according to claim 1, wherein the rest position locking device is independent of the rotation blocking device.

5. The trailer coupling according to claim 1, wherein, on reaching the pivot position of the pivot bearing body corresponding to the rest position, due to a spring element provided in the rest position locking device, the rest position locking device transitions automatically into the active position.

6. The trailer coupling according to claim 1, wherein the rest position locking device, when it is not in the active position, is always in a locking readiness position.

7. The trailer coupling according to claim 1, wherein the rest position locking device comprises a locking body which is movable from an active position into an inactive position.

8. The trailer coupling according to claim 7, wherein the locking body arranged on the pivot bearing body or the pivot bearing unit is movable in a locking direction and is bringable, in the active position, into engagement with a locking receptacle arranged in the pivot bearing unit or the pivot bearing body.

9. The trailer coupling according to claim 8, wherein the locking body movable in the locking direction is arranged in the pivot bearing body and wherein the locking receptacle is arranged on the pivot bearing unit.

10. The trailer coupling according to claim 8, wherein a deactivating unit is provided with which the rest position locking device is transitionable from the active position into the inactive position, independently of the pivot movement of the pivot bearing body, wherein associated with the locking receptacle is an actuating body of the deactivating unit which, with the deactivating unit operative, displaces the locking body out of the locking receptacle.

11. The trailer coupling according to claim 1, wherein the trailer coupling has a securing device which secures the rotation blocking device in the rotation blocking position against a transition into the releasing position.

12. The trailer coupling according to claim 11, wherein associated with the securing device is a detector which detects a securing or unsecuring position of a securing pin securing the rotation blocking position.

13. The trailer coupling according to claim 1, wherein the rotation blocking device has at least two rotation blocking bodies which are movably guided by a guide body in a guiding direction, wherein in the operating position, the rotation blocking bodies are bringable into a rotation blocking position by a movement in the guiding direction and therein are each in engagement with a receptacle in the pivot bearing body in order to block a pivot movement of the pivot bearing body about the pivot axis relative to the guide body and are bringable into a releasing position and therein are out of engagement with the respective receptacle, and wherein the rotation blocking device comprises an actuating body having a pressure surface extending transversely to the guiding direction for each of the rotation blocking bodies, by the movement of which in an actuating direction, the at least two rotation blocking bodies are movable and urgeable in the guiding direction.

14. The trailer coupling according to claim 13, wherein the rotation blocking bodies are arranged around the actuating body.

15. The trailer coupling according to claim 13, wherein the actuating body is arranged to be rotatable about the pivot axis and in particular has wedge surfaces extending over an angular range around the pivot axis and varying parallel to the guiding direction.

16. The trailer coupling according to claim 13, wherein the guiding direction extends with at least one component in a direction radial to the pivot axis.

17. The trailer coupling according to claim 13, wherein the rotation blocking body is guided by the guide body adjoining the pivot bearing body in a radial direction.

18. The trailer coupling according to claim 13, wherein the guide body has a guide sleeve with the guiding receptacle for the respective rotation blocking body.

19. The trailer coupling according to claim 13, wherein the guide body movably guides the actuating body.

20. The trailer coupling according to claim 13, wherein the guide body forms a pivot bearing for the pivot bearing body.

21. The trailer coupling according to claim 13, wherein the guide body is part of the pivot bearing unit fixedly arranged on a vehicle.

22. The trailer coupling according to claim 13, wherein the actuating body is surrounded by the guide body and wherein, in particular, the pivot bearing body embraces the guide body.

23. The trailer coupling according to claim 1, wherein the pivot bearing body forms an outer body externally surrounding the pivot bearing unit, said outer body being arranged non-displaceably relative to the pivot bearing unit in the direction of the pivot axis and wherein, in particular, the first end of the ball neck is fixed to the outer body.

24. The trailer coupling according to claim 1, wherein the pivot bearing body forms an outer body externally surrounding a partial region of the rotation blocking unit, said outer body being arranged non-displaceably relative to the guide body in the direction of the pivot axis.

25. A trailer coupling comprising a ball neck which is movable between an operating position and a rest position with a pivot bearing body arranged on a first end and a coupling ball arranged on a second end, a pivot bearing unit fixedly arranged on a vehicle, by which pivot bearing unit the pivot bearing body is accommodated to be pivotable about a pivot axis between the operating position and the rest position, a rotation blocking device which, in the operating position, in a rotation blocking position, blocks a pivot movement of the pivot bearing body about the pivot axis and, in a releasing position, frees the pivot movement of the pivot bearing body, and a rest position locking device which, in an inactive position, permits a movement of the pivot bearing body relative to the pivot bearing unit and, in a locking position, non-rotatably fixes the pivot bearing body relative to the pivot bearing unit in the rest position, wherein associated with the rest position locking device is a detector unit which detects at least one active position of the rest position locking device, wherein the detector unit detects the at least one position of the rest position locking device by a magnetic field influenced by the at least one position of the rest position locking device.

26. The trailer coupling according to claim 25, wherein the detector unit has a magnetic field sensor.

27. The trailer coupling according to claim 26, wherein the magnetic field sensor detects a magnetic field of a magnet which is movable by the movement of the rest position locking device.

28. The trailer coupling according to claim 26, wherein the magnetic field sensor detects a magnetic field of a magnet statically associated with it and influenced by the positions of the rest position locking device.

29. A trailer coupling comprising a ball neck which is movable between an operating position and a rest position with a pivot bearing body arranged on a first end and a coupling ball arranged on a second end, a pivot bearing unit fixedly arranged on a vehicle, by which pivot bearing unit the pivot bearing body is accommodated to be pivotable about a pivot axis between the operating position and the rest position, a rotation blocking device which, in the operating position, in a rotation blocking position, blocks a pivot movement of the pivot bearing body about the pivot axis and, in a releasing position, frees the pivot movement of the pivot bearing body, and a rest position locking device which, in an inactive position, permits a movement of the pivot bearing body relative to the pivot bearing unit and, in a locking position, non-rotatably fixes the pivot bearing body relative to the pivot bearing unit in the rest position, wherein associated with the rest position locking device is a detector unit which detects at least one active position of the rest position locking device, wherein the detector unit detects at least the active position of the rest position locking device through a covering of the pivot bearing unit, said covering overlapping the rest position locking device.

30. A trailer coupling comprising a ball neck which is movable between an operating position and a rest position with a pivot bearing body arranged on a first end and a coupling ball arranged on a second end, a pivot bearing unit fixedly arranged on a vehicle, by which pivot bearing unit the pivot bearing body is accommodated to be pivotable about a pivot axis between the operating position and the rest position, a rotation blocking device which, in the operating position, in a rotation blocking position, blocks a pivot movement of the pivot bearing body about the pivot axis and, in a releasing position, frees the pivot movement of the pivot bearing body, and a rest position locking device which, in an inactive position, permits a movement of the pivot bearing body relative to the pivot bearing unit and, in a locking position, non-rotatably fixes the pivot bearing body relative to the pivot bearing unit in the rest position, wherein associated with the rest position locking device is a detector unit which detects at least one active position of the rest position locking device, wherein a deactivating unit is provided with which the rest position locking device is transitionable from the active position into the inactive position, independently of the pivot movement of the pivot bearing body.

31. The trailer coupling according to claim 30, wherein the rest position locking device is transitionable by the deactivating unit, dependent upon a particular functional state of the trailer coupling, from the active position into the inactive position.

32. The trailer coupling according to claim 31, wherein the rest position locking device is transitionable by the deactivating unit, before a pivoting of the pivot bearing body from the rest position into the operating position, from the active position into the inactive position.

33. The trailer coupling according to claim 30, wherein the rest position locking device is transitionable by the deactivating unit, by a drive unit cooperating with the deactivating unit, from the active position into the inactive position.

34. A trailer coupling comprising a ball neck which is movable between an operating position and a rest position with a pivot bearing body arranged on a first end and a coupling ball arranged on a second end, a pivot bearing unit fixedly arranged on a vehicle, by which pivot bearing unit the pivot bearing body is accommodated to be pivotable about a pivot axis between the operating position and the rest position, a rotation blocking device which, in the operating position, in a rotation blocking position, blocks a pivot movement of the pivot bearing body about the pivot axis and, in a releasing position, frees the pivot movement of the pivot bearing body, and a rest position locking device which, in an inactive position, permits a movement of the pivot bearing body relative to the pivot bearing unit and, in a locking position, non-rotatably fixes the pivot bearing body relative to the pivot bearing unit in the rest position, wherein associated with the rest position locking device is a detector unit which detects at least one active position of the rest position locking device, wherein the trailer coupling has a state evaluating unit which evaluates at least one signal of the detector unit and generates a signal indicating a secured rest position.

35. The trailer coupling according to claim 34, wherein the detector of the securing device cooperates with the state evaluating unit and wherein the state evaluating unit generates a signal indicating a secured rotation blocking position of the rotation blocking device.

36. The trailer coupling according to claim 34, wherein the state evaluating unit only generates the signal indicating a secured rest position when the detector unit signals the active position of the rest position locking device and also the detector signals the unsecuring position of the securing device.

37. The trailer coupling according to claim 34, wherein the state evaluating unit only generates the signal indicating a secured operating position when the detector signals the securing position of the securing device and the detector unit signals the inactive position of the rest position locking device.

* * * * *